(12) United States Patent
Chande et al.

(10) Patent No.: US 11,540,306 B2
(45) Date of Patent: Dec. 27, 2022

(54) CHANNEL OCCUPANCY TIME IN A NO-LISTEN BEFORE TALK CHANNEL ACCESS MODE

(71) Applicant: QUALCOMM Incorporated, San Diego, CA (US)

(72) Inventors: Vinay Chande, San Diego, CA (US); Jing Sun, San Diego, CA (US); Arumugam Chendamarai Kannan, San Diego, CA (US); Xiaoxia Zhang, San Diego, CA (US); Aleksandar Damnjanovic, Del Mar, CA (US); Tao Luo, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 0 days.

(21) Appl. No.: 17/150,846

(22) Filed: Jan. 15, 2021

(65) Prior Publication Data

US 2022/0232588 A1    Jul. 21, 2022

(51) Int. Cl.
*H04W 72/12*    (2009.01)
*H04W 72/04*    (2009.01)
*H04W 74/02*    (2009.01)

(52) U.S. Cl.
CPC ..... *H04W 72/1268* (2013.01); *H04W 72/044* (2013.01); *H04W 74/02* (2013.01)

(58) Field of Classification Search
CPC ..... H04W 72/14; H04W 74/02; H04W 16/14; H04W 72/04; H04W 72/12; H04W 72/1268; H04W 72/044
See application file for complete search history.

(56) References Cited

U.S. PATENT DOCUMENTS

| | | | |
|---|---|---|---|
| 2001/0023442 A1 | 9/2001 | Masters | |
| 2006/0020684 A1 | 1/2006 | Mukherjee et al. | |
| 2008/0091284 A1 | 4/2008 | Sugiyama et al. | |
| 2018/0316417 A1* | 11/2018 | Motoyoshi | H04B 7/18523 |
| 2019/0387412 A1* | 12/2019 | Kim | H04L 27/2656 |
| 2020/0037354 A1 | 1/2020 | Li et al. | |
| 2020/0146058 A1* | 5/2020 | Xu | H04L 5/0092 |
| 2020/0267730 A1* | 8/2020 | Kim | H04W 72/0453 |
| 2020/0314899 A1 | 10/2020 | Sun et al. | |
| 2020/0314901 A1 | 10/2020 | Bhattad et al. | |
| 2020/0359411 A1* | 11/2020 | Li | H04W 74/0808 |
| 2021/0385850 A1 | 12/2021 | Yoshioka et al. | |

OTHER PUBLICATIONS

International Search Report and Written Opinion—PCT/US2022/070207—ISA/EPO—dated May 24, 2022.

* cited by examiner

*Primary Examiner* — Anez C Ebrahim
(74) *Attorney, Agent, or Firm* — Harrity & Harrity, LLP

(57) ABSTRACT

Various aspects of the present disclosure generally relate to wireless communication. In some aspects, a wireless communication device (WCD) may communicate, during a channel occupancy time (COT) associated with one or more resources, via a no listen before talk (no-LBT) channel access mode. The WCD may initiate, after the COT, a reduced COT associated with the one or more resources, wherein the WCD is configured to reduce channel occupancy during the reduced COT. Numerous other aspects are described.

30 Claims, 14 Drawing Sheets

CHANNEL OCCUPANCY TIME IN A NO-LISTEN BEFORE TALK CHANNEL ACCESS MODE

FIELD OF THE DISCLOSURE

Aspects of the present disclosure generally relate to wireless communication and to techniques and apparatuses for channel occupancy time in a no-listen before talk channel access mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless communication device (WCD) includes communicating, during a channel occupancy time (COT) associated with one or more resources, via a no listen before talk (no-LBT) channel access mode; and initiating, after the COT, a reduced COT associated with the one or more resources, wherein the WCD is configured to reduce channel occupancy during the reduced COT.

In some aspects, a WCD includes a memory; and one or more processors operatively coupled to the memory, the memory and the one or more processors configured to: communicate, during a COT associated with one or more resources, via a LBT channel access mode; and initiate, after the COT, a reduced COT associated with the one or more resources, wherein the WCD is configured to reduce channel occupancy during the reduced COT.

In some aspects, a non-transitory computer-readable medium storing a set of instructions for wireless communication includes one or more instructions that, when executed by one or more processors of a WCD, cause the WCD to: communicate, during a COT associated with one or more resources, via a LBT channel access mode; and initiate, after the COT, a reduced COT associated with the one or more resources, wherein the WCD is configured to reduce channel occupancy during the reduced COT.

In some aspects, an apparatus for wireless communication includes means for communicating, during a COT associated with one or more resources, via a LBT channel access mode; and means for initiating, after the COT, a reduced COT associated with the one or more resources, wherein the apparatus is configured to reduce channel occupancy during the reduced COT.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
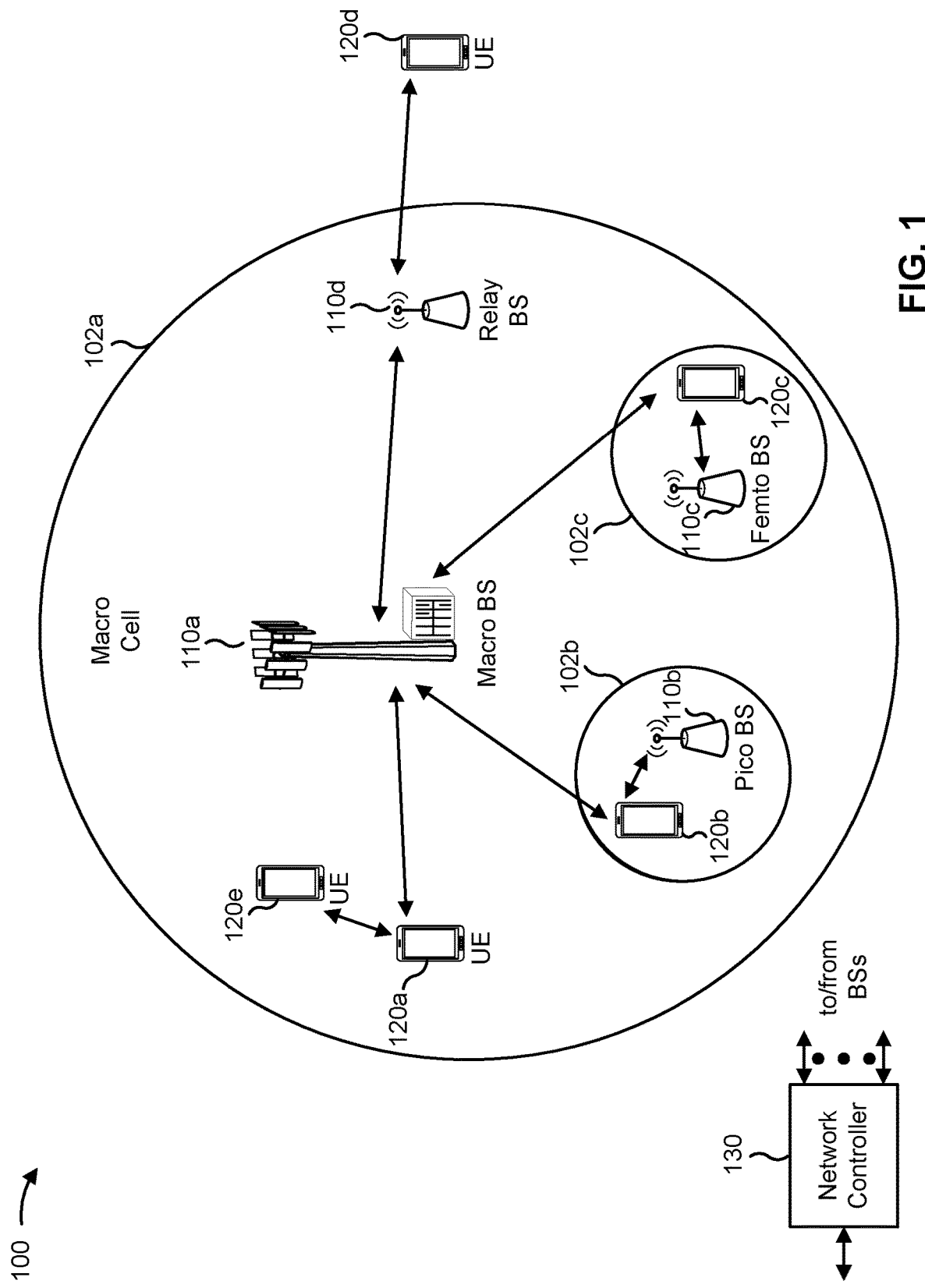
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 610 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-500 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
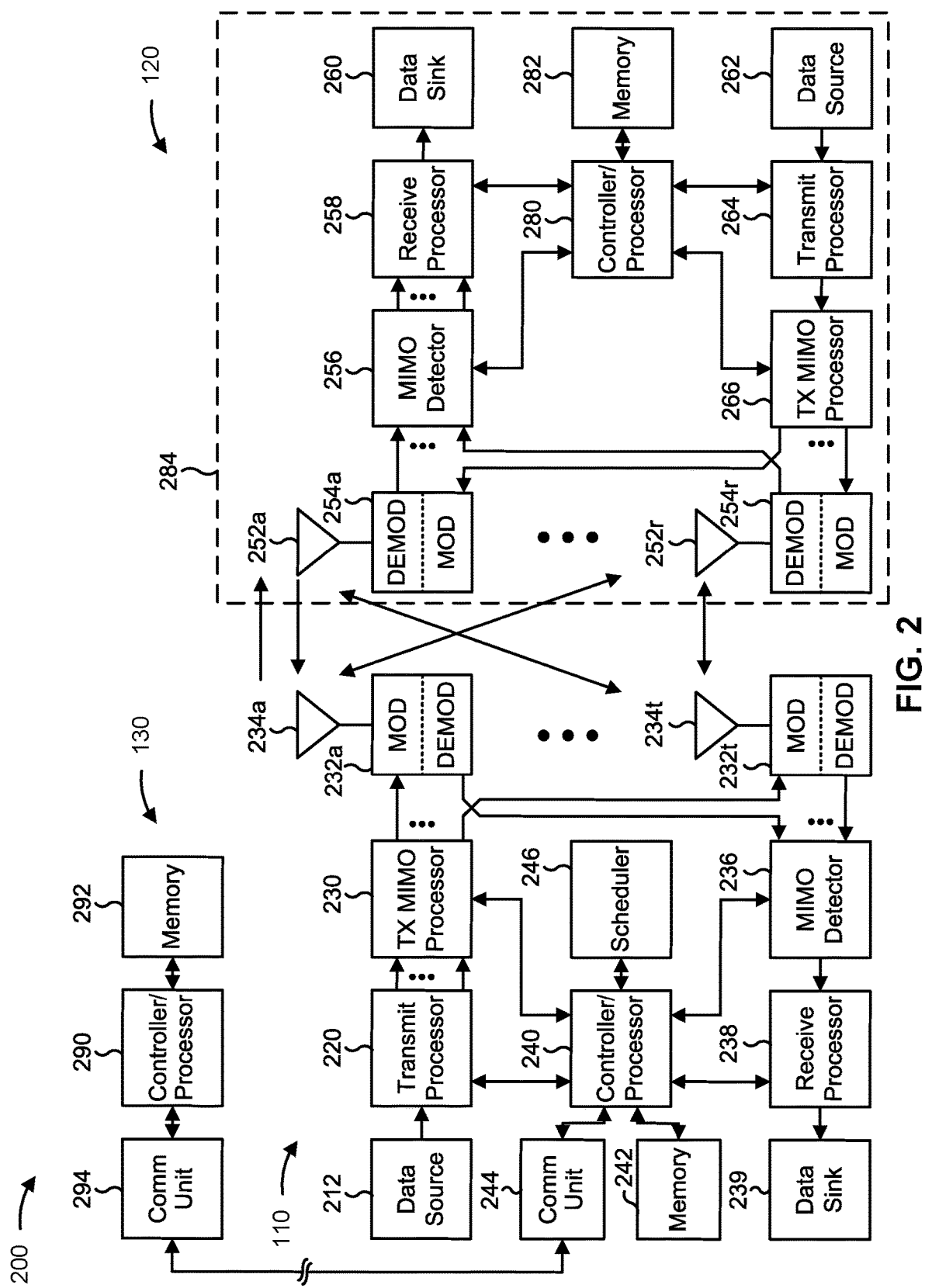
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-13.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-13.

Controller/processor 240 of base station 110, controller/processor 280 of UE 120, and/or any other component(s) of FIG. 2 may perform one or more techniques associated with channel occupancy time in a no-listen before talk channel access mode, as described in more detail elsewhere herein. In some aspects, the WCD described herein is the base station 110, is included in the base station 110, or includes one or more components of the base station 110 shown in FIG. 2. In some aspects, the WCD described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 1300 of FIG. 13 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13 and/or other processes as described herein. In some aspects, executing instructions may include running the instructions, converting the instructions, compiling the instructions, and/or interpreting the instructions, among other examples.

In some aspects, the WCD includes means for communicating, during a COT associated with one or more resources, via a LBT channel access mode; or means for initiating, after the COT, a reduced COT associated with the one or more resources, wherein the WCD is configured to reduce channel occupancy during the reduced COT. In some aspects, the means for the WCD to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the WCD to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the WCD includes means for reducing transmit power for transmissions, means for reducing an effective isotropic radiated power for transmissions, means for changing a traffic direction, means for reducing a beamforming gain, means for changing a beam direction, or means for changing a direction of beamforming with a threshold angular separation.

In some aspects, the WCD includes means for determining to initiate the reduced COT based at least in part on one or more of: means for detecting a gap in reception or transmission of communications, or means for detecting a gap, with a duration that satisfies a gap duration threshold, in reception or transmission of communications.

In some aspects, the WCD includes means for initiating the reduced COT for a set of resources within one or more frequency resources.

In some aspects, the WCD includes means for initiating the reduced COT for communication associated with a set of beams, or means for initiating the reduced COT for communication associated with all beams associated with the WCD.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
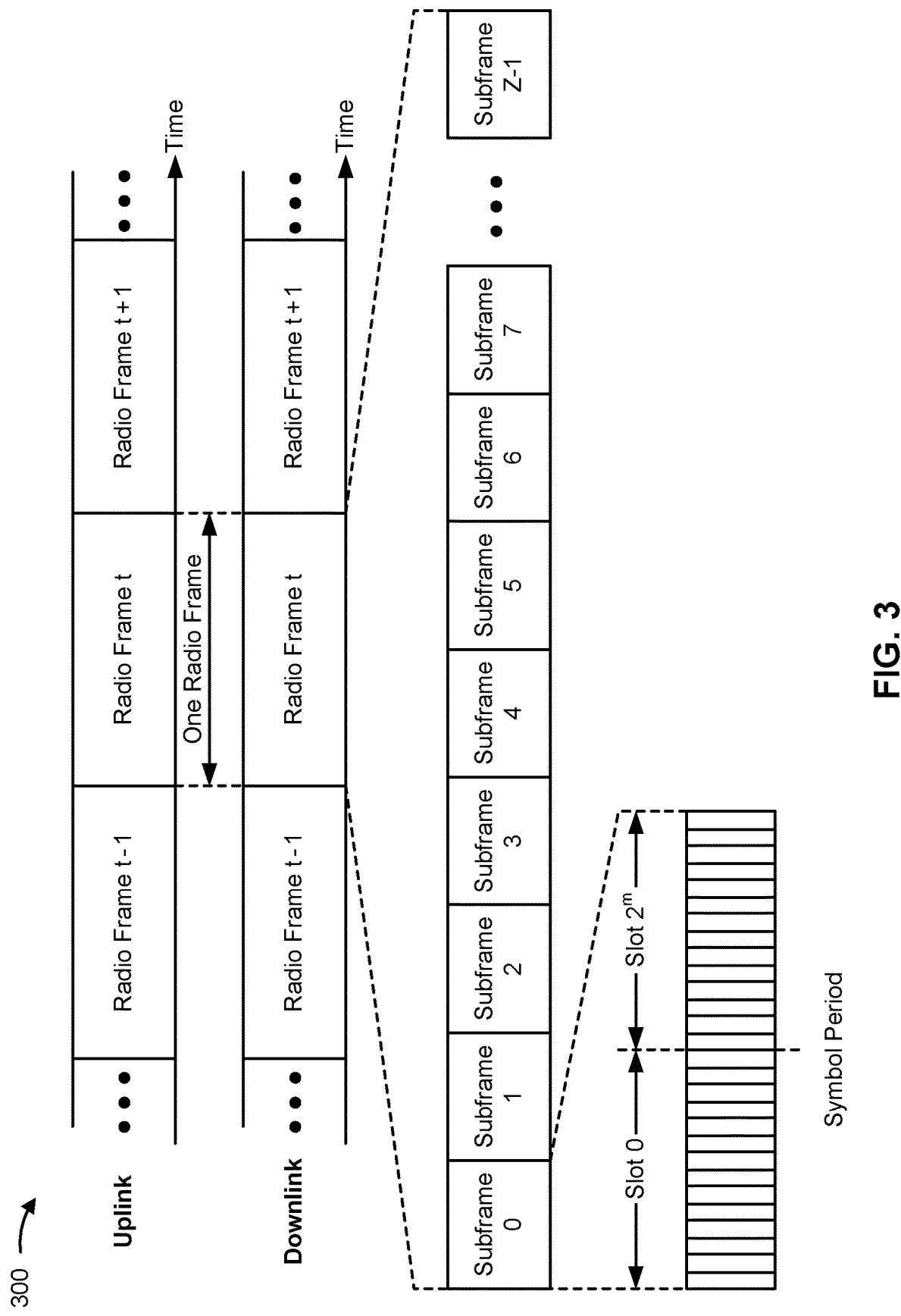
FIG. 3 is a diagram illustrating an example of a frame structure in a wireless communication network, in accordance with various aspects of the present disclosure.

FIG. 3 is a diagram illustrating an example 300 of a frame structure in a wireless communication network, in accordance with various aspects of the present disclosure. The frame structure shown in FIG. 3 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 3, where m is an index of a numerology used for a transmission, such as 0, 1, 2, 3, 4, or another number). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, or symbol-based.

As indicated above, FIG. 3 is provided as an example. Other examples may differ from what is described with respect to FIG. 3.

Figure 4:
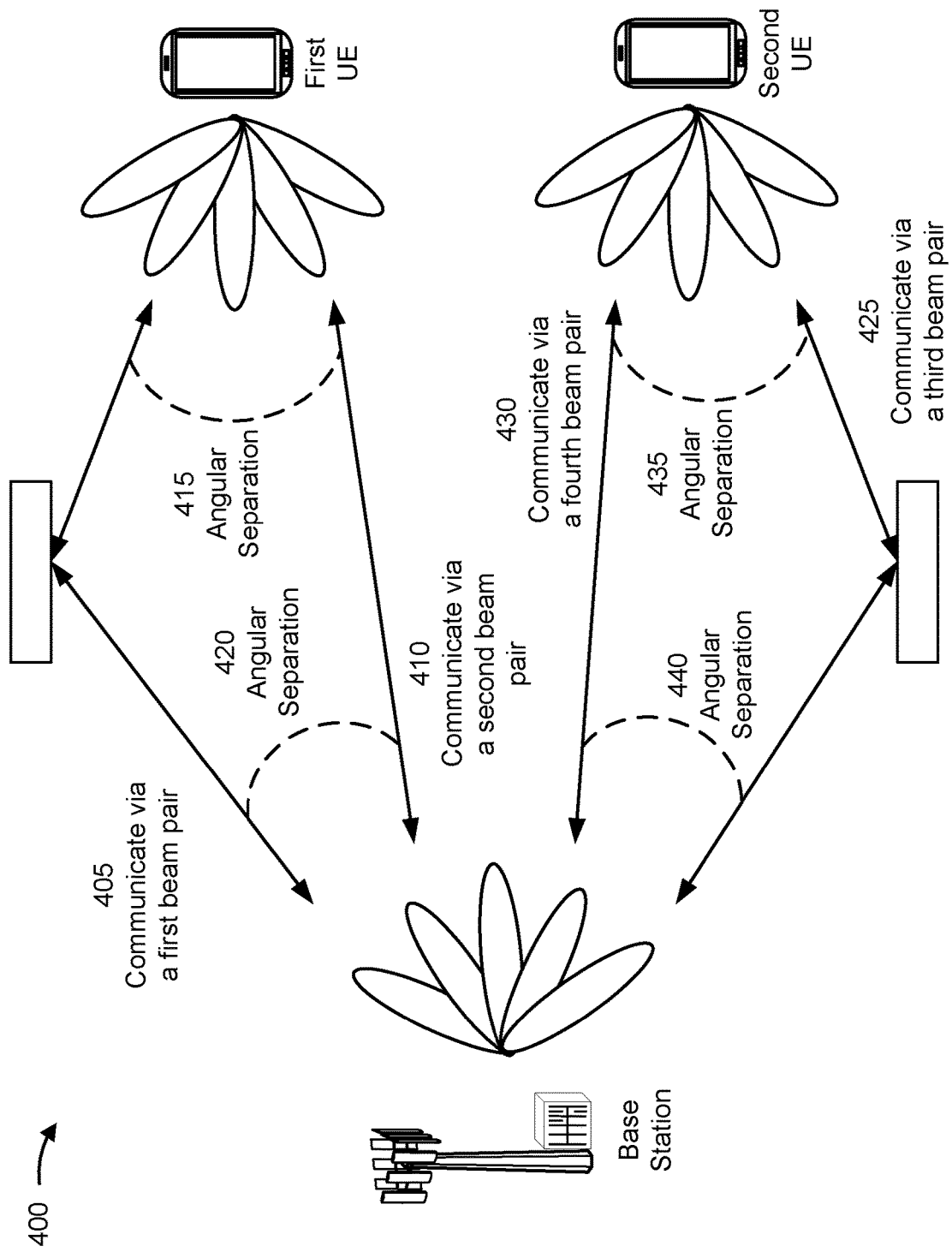
FIG. 4 is a diagram of communication via beamforming, in accordance with various aspects of the present disclosure.

FIG. 4 is a diagram of communication via beamforming, in accordance with various aspects of the present disclosure. As shown in FIG. 4, a base station may communicate with a first UE and/or a second UE using various beam pairs. A beam pair may include a base station beam (e.g., a base station transmit beam and/or a base station receive beam) and a UE beam (e.g., a UE receive beam and/or a UE transmit beam).

As shown by reference number 405, the base station and the first UE may communicate via a first beam pair. The first beam pair may be associated with a first base station beam direction (e.g., associated with a transmission configuration information (TCI) state identification) and a first UE beam direction of the first UE (e.g., associated with a TCI state identification and/or a spatial relation). The first beam pair may be associated with a first communication path.

As shown by reference number 410, the base station and the first UE may communicate via a second beam pair. The second beam pair may be associated with a second base station beam direction and a second UE beam direction of the first UE. The second beam pair may be associated with a second communication path.

The first UE beam direction of the first UE, associated with the first beam pair and/or the first communication path, may have an angular separation 415 from the second UE beam direction of the first UE, associated with the second beam pair and/or the second communication path. The first base station beam direction, associated with the first beam pair and/or the first communication path, may have an angular separation 420 from the second base station beam direction, associated with the second beam pair and/or the second communication path.

As shown by reference number 425, the base station and the second UE may communicate via a third beam pair. The third beam pair may be associated with a third base station beam direction (e.g., associated with a transmission configuration information (TCI) state identification) and a first UE beam direction of the second UE (e.g., associated with a TCI state identification and/or a spatial relation). The third beam pair may be associated with a third communication path.

As shown by reference number 430, the base station and the second UE may communicate via a fourth beam pair. The fourth beam pair may be associated with a fourth base station beam direction and a second UE beam direction of the second UE. The fourth beam pair may be associated with a fourth communication path.

The first UE beam direction of the second UE, associated with the third beam pair and/or the third communication path, may have an angular separation 435 from the second UE beam direction of the second UE, associated with the fourth beam pair and/or the fourth communication path. The third base station beam direction, associated with the third beam pair and/or the third communication path, may have an angular separation 440 from the fourth base station beam direction, associated with the fourth beam pair and/or the fourth communication path.

As indicated above, FIG. 4 is provided as an example. Other examples may differ from what is described with regard to FIG. 4.

In some wireless networks that operate in an unlicensed spectrum (e.g., sub 7 GHz and/or millimeter wave bands, among other examples), WCDs may communicate without using an LBT protocol (e.g., a no-LBT channel access mode). Communicating using no-LBT channel access mode may conserve power, computing, and/or communication resources of the WCD based at least in part on eliminating medium sensing and/or channel sensing operations used to gain channel access. However, coexistence between WCDs and/or multiple networks operating in a same unlicensed spectrum may be difficult to manage without LBT.

Some networks may implement an upper limit on duty cycle for the WCDs or networks operating in an unlicensed spectrum. However, this may consume computing and/or power resources of the WCD to compute duty cycle within a rolling window of time. Additionally, or alternatively, the upper limit on duty cycle may limit peak data rates that are available for the WCD.

Some networks may implement an upper limit on a burst duration for a no-LBT transmission. For example, the networks may limit a bust duration for a contention exempt transmission, such as short control signaling. However, the upper limit on burst duration may limit peak data rates that are available for the WCD.

Some networks may implement a lower limit on beamforming gain (e.g., an upper limit on a beam width) and/or limits on a bandwidth of a no-LBT transmission. However, these limits may limit peak data rates that are available for the WCD and/or may consume computing and/or power resources of the WCD to comply.

In some aspects described herein, a WCD may be configured to communicate during a COT associated with one or more resources and may initiate, after the COT, a reduced COT associated with the one or more resources. In some aspects, a duration of the reduced COT may be based at least in part on a duration of the COT (e.g., the reduced COT may have a relatively long duration based at least in part on a relatively long duration of the COT). In some aspects, the duration of the reduced COT may be a configured duration, a random duration (e.g., that is based at least in part on a distribution parameterized by a function of a duration of the COT). The duration of the reduced COT may be within an order of magnitude of the duration of the COT. In some aspects, the duration of the reduced COT may be at least 1/10 of the duration of the COT, at least 1/5 of the duration of the COT, or at least 1/2 of the duration of the COT, among other examples.

In some aspects, the WCD may reduce channel occupancy during the reduced COT based at least in part on not initiating channel occupancy, not transmitting control information via a control channel, not attempting to receive signals from an additional WCD, not attempting to receive data via a data channel, and/or not attempting to receive control information via a control channel. In some aspects, the WCD may reduce channel occupancy during the reduced COT based at least in part on modifying one or more parameters by reducing transmit power for transmissions, reducing an effective isotropic radiated power for transmissions, changing a traffic direction, reducing a beamforming gain, changing a beam direction, and/or changing a direction of beamforming with a threshold angular separation, among other examples.

Based at least in part on the WCD initiating the reduced COT after the COT, the WCD may avoid sensing operations and/or may improve latency based at least in part on avoiding the sensing operations. Based at least in part on the duration of the reduced COT being based at least in part on the duration of the COT, the network may support communications that use a relatively long COT and communications that use a relatively short COT with proportional times for the reduced COT.

Figure 5:
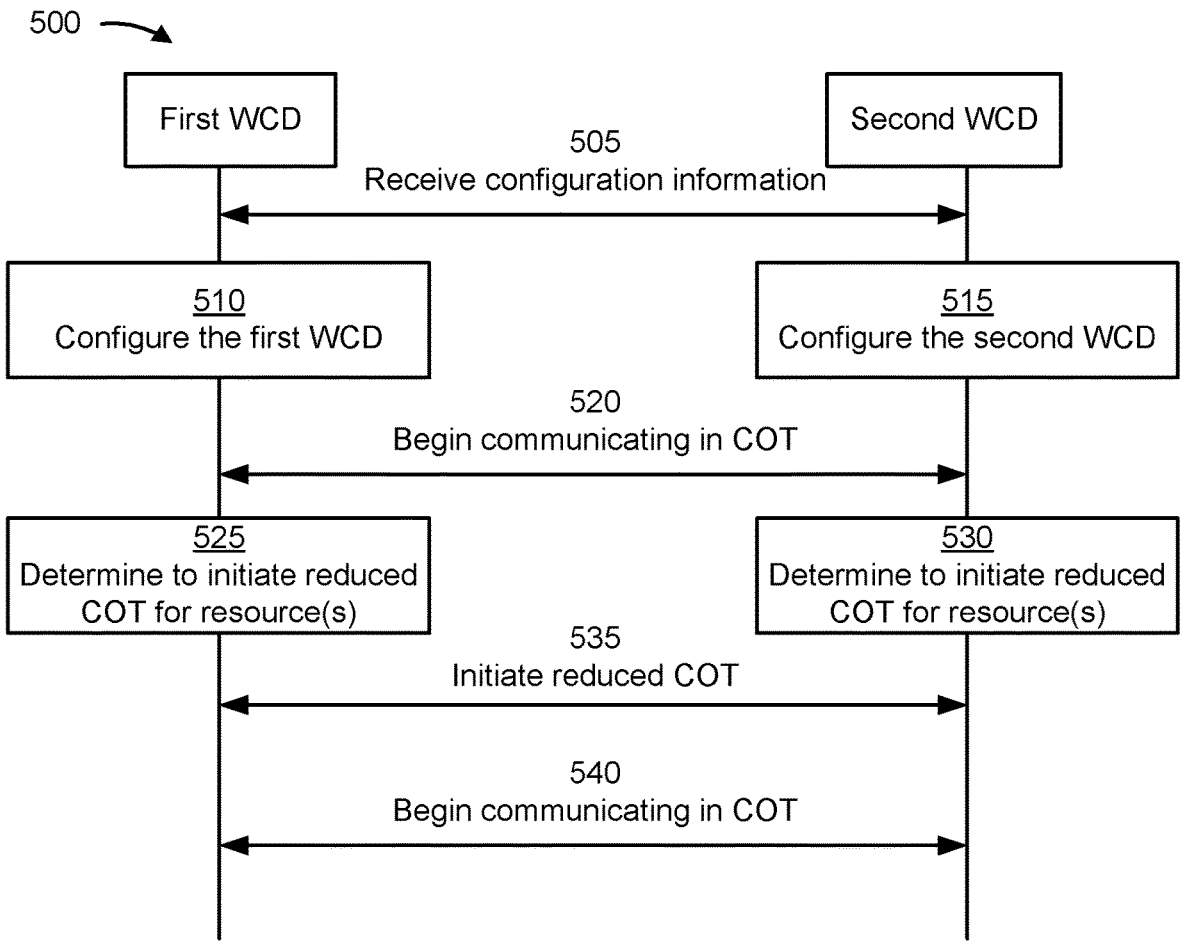
FIGS. 5-12 are diagrams illustrating examples associated with channel occupancy time in a no-listen before talk channel access mode, in accordance with various aspects of the present disclosure.

FIG. 5 is a diagram illustrating an example 500 of uplink transmissions in an unlicensed band, in accordance with various aspects of the present disclosure. As shown in FIG. 5, a first WCD (e.g., base station 110 or UE 120, among other examples) may communicate with a second WCD (e.g., base station 110 or UE 120, among other examples). In some aspects, the first WCD and the second WCD may be part of a wireless network (e.g., wireless network 100). In some aspects, the first WCD and the second WCD may communicate via an unlicensed band that does not require channel sensing (e.g., no-LBT channel access) before beginning a transmission. In some aspects, the wireless network may include an unlicensed band in a sub 7 GHz band and/or one or more millimeter wave bands.

As shown by reference number 505, the first WCD and/or the second WCD may receive configuration information (e.g., from a base station and/or the like) and/or determine the configuration information based at least in part on a communication standard. In some aspects, the first WCD and/or the second WCD may receive the configuration information via one or more of a system information block, radio resource control (RRC) signaling, medium access control control elements (MAC CEs), a sidelink communication, and/or the like. In some aspects, the configuration information may include an indication of one or more configuration parameters (e.g., already known to the first WCD or the second WCD) for selection by the first WCD or the second WCD, explicit configuration information for the first WCD or the second WCD to use to configure the first WCD or the second WCD, and/or the like.

In some aspects, the configuration information may indicate that the first WCD and/or the second WCD are to initiate a reduced COT (e.g., an away time) after communicating during a COT. In some aspects, the configuration information may indicate a duration of the reduced COT and/or how to determine a duration of the reduced COT, among other examples. In some aspects, the configuration information may indicate that the COT is to apply to all communications, communications via a set of frequency ranges, communications via a set of beams, and/or communications with a single additional WCD or multiple additional WCDs.

As shown by reference number 510, the first WCD may configure the first WCD based at least in part on the configuration information. As shown by reference number 515 the second WCD may configure the second WCD based at least in part on the configuration information. In some aspects, the first WCD and the second WCD may be configured to perform one or more operations described herein.

As shown by reference number 520, the first WCD and the second WCD may begin communicating in a COT. For example, the first WCD and the second WCD may communicate during a COT associated with one or more resources. The first WCD and the second WCD may communicate via a no-LBT channel access mode. In some aspects, communicating may include the first WCD transmitting a communication to the second WCD, the second WCD transmitting a communication to the first WCD, and/or the first WCD or the second WCD transmitting a communication to a third WCD, among other examples.

In some aspects, the COT may be configured with a duration that satisfies a threshold duration for communicating via one or more resources. For example, the duration configured for the COT may be less than or equal to the threshold duration. In some aspects, the threshold duration may be different for different frequency resources and/or may be different for different beams or beam widths, among other examples. In some aspects, the first WCD and/or the second WCD may be configured to communicate, before initiating the reduced COT, for the duration that satisfies the threshold duration.

In some aspects, the duration of the COT may be based at least in part on an amount of time (e.g., a number of slots and/or subslots) of transmissions or receptions without a gap or an amount of time of transmissions or receptions without a gap that satisfies a gap duration threshold (e.g., a duration that is longer than a duration between a transmission and a reception of associated hybrid automatic repeat request (HARD) feedback), among other examples. In some aspects, the duration of the COT may be based at least in part on an amount of time of transmissions and receptions (e.g., transmissions and receptions are communications used to determine the amount of time) without a gap or an amount of time of transmissions and receptions without a gap that satisfies a gap duration threshold, among other examples. In some aspects, the duration of the COT may be based at least in part on an amount of time of transmissions and/or receptions, without a gap, with multiple WCDs or an amount of time of transmissions and/or receptions, without a gap, with multiple WCDs that satisfies a threshold duration, among other examples.

In some aspects, the duration of the COT may be based at least in part on an amount of time of communication via a set of beams. For example, the duration of the COT may be based at least in part on an amount of time of communication via a set of beams without a gap, an amount of time of communication via a set of beams without a gap that satisfies a gap duration threshold, an amount of time of communication via all beams, associated with the WCD, without a gap, and/or an amount of time of communication via all beams, associated with the WCD, without a gap that satisfies a gap duration threshold, among other examples.

As shown by reference number 525, the first WCD may determine to initiate a reduced COT for one or more resources. For example, the first WCD may determine to initiate the reduced COT based at least in part on detecting a gap in reception or transmission of communications, or detecting a gap in reception or transmission of communications with a duration of the gap satisfying a gap duration threshold. In some aspects, the first WCD may determine to initiate the reduced COT based at least in part on a COT duration threshold. In some aspects, the first WCD may determine to initiate the reduced COT based at least in part on a determination that the first WCD has no data, or an amount of data that satisfies a threshold, for transmission to the second WCD.

As shown by reference number 530, the second WCD may determine to initiate a reduced COT for one or more resources. For example, the first WCD may determine to initiate the reduced COT based at least in part on detecting a gap in reception or transmission of communications, or detecting a gap in reception or transmission of communications with a duration of the gap satisfying a gap duration threshold. In some aspects, the second WCD may determine to initiate the reduced COT based at least in part on a COT duration threshold. In some aspects, the second WCD may determine to initiate the reduced COT based at least in part on a determination that the second WCD has no data, or an amount of data that satisfies a threshold, for transmission to the first WCD.

As shown by reference number 535, the first WCD and/or the second WCD may initiate the reduced COT. For example, the first WCD and/or the second WCD may initiate the reduced COT associated with the one or more resources after the COT.

In some aspects, the first WCD and/or the second WCD may initiate the reduced COT for a set of resources within one or more frequency resources. In some aspects, the first WCD and/or the second WCD may initiate the reduced COT for resources within all frequency resources (e.g., all frequency resources of the unlicensed spectrum). In some aspects, the first WCD and/or the second WCD may initiate the reduced COT for one or more physical resource blocks, one or more component carriers, one or more bandwidth parts, and/or one or more LBT bandwidths (e.g., one or more 20 MHz bandwidth parts).

In some aspects, the first WCD and/or the second WCD may initiate the reduced COT for a set of beams (e.g., communication associated with the set of beams). In some aspects, the first WCD and/or the second WCD may initiate the reduced COT for all beams (e.g., all beams within frequency resources of the unlicensed spectrum).

In some aspects, the reduced COT may have a duration that is based at least in part on a duration of the COT, a configured amount of time (e.g., a constant amount of time that is not based in part on the duration of the COT), a configured number of slots or subslots, and/or a randomly (e.g., pseudorandomly) generated amount of time drawn from a distribution that is based at least in part on the duration of the COT. For example, the first WCD and/or the second WCD may generate a distribution of candidate amounts of time, may receive an indication of the distribution of the candidate amounts of time, and/or transmit an indication of the distribution of the candidate amounts of time. The first WCD and/or the second WCD may randomly select a candidate amount of time from the distribution.

In some aspects, the first WCD and/or the second WCD may be configured to reduce communications during the reduced COT. For example, the first WCD and/or the second WCD may reduce communications during the reduced COT by not transmitting data via a data channel, not transmitting control information via a control channel, not attempting to receive signals from an additional WCD, not attempting to receive data via a data channel, and/or not attempting to receive control information via a control channel, among other examples.

In some aspects, the first WCD and/or the second WCD may be configured to modify one or more communication parameters during the reduced COT. For example, the first WCD and/or the second WCD may modify one or more communication parameters during the reduced COT by reducing transmit power for transmissions and/or reducing an effective isotropic radiated power (EIRP) for transmissions. For example, the first WCD and/or the second WCD may reduce transmit power, which may reduce an EIRP for transmissions. In some aspects, the first WCD and/or the second WCD may modify one or more communication parameters during the reduced COT by changing a traffic direction (e.g., switching from using a beam pair for downlink communications to using the beam pair for uplink communications or from using a beam pair for uplink communications to using the beam pair for downlink communications).

In some aspects, the first WCD and/or the second WCD may modify one or more communication parameters during the reduced COT by changing one or more beamforming parameters, such as modifying a beamforming gain (e.g., widening or narrowing a beam for transmissions, among other examples), changing a beam direction (e.g., using a different beam for communication), and/or changing a direction of beamforming with a threshold angular separation (e.g., changing to a different beam with an angular separation that satisfies a threshold), among other examples. In this way, the first WCD and/or the second WCD may continue to communicate without occupying a same channel within a same geolocation (e.g., associated with a beam previously used to communicate).

As shown by reference number 540, the first WCD and the second WCD may begin communicating in the COT. In some aspects, the first WCD may begin communicating in the COT based at least in part on being in the reduced COT for an amount of time that satisfies a threshold (e.g., a determined duration of the reduced COT).

Based at least in part on the first WCD and/or the second WCD initiating the reduced COT after the COT, the first WCD and/or the second WCD may avoid sensing operations and/or may improve latency based at least in part on avoiding the sensing operations. Based at least in part on the duration of the reduced COT being based at least in part on the duration of the COT, the network may support communications that use a relatively long COT and communications that use a relatively short COT with proportional times for the reduced COT.

As indicated above, FIG. 5 is provided as an example. Other examples may differ from what is described with regard to FIG. 5.

Figure 6:
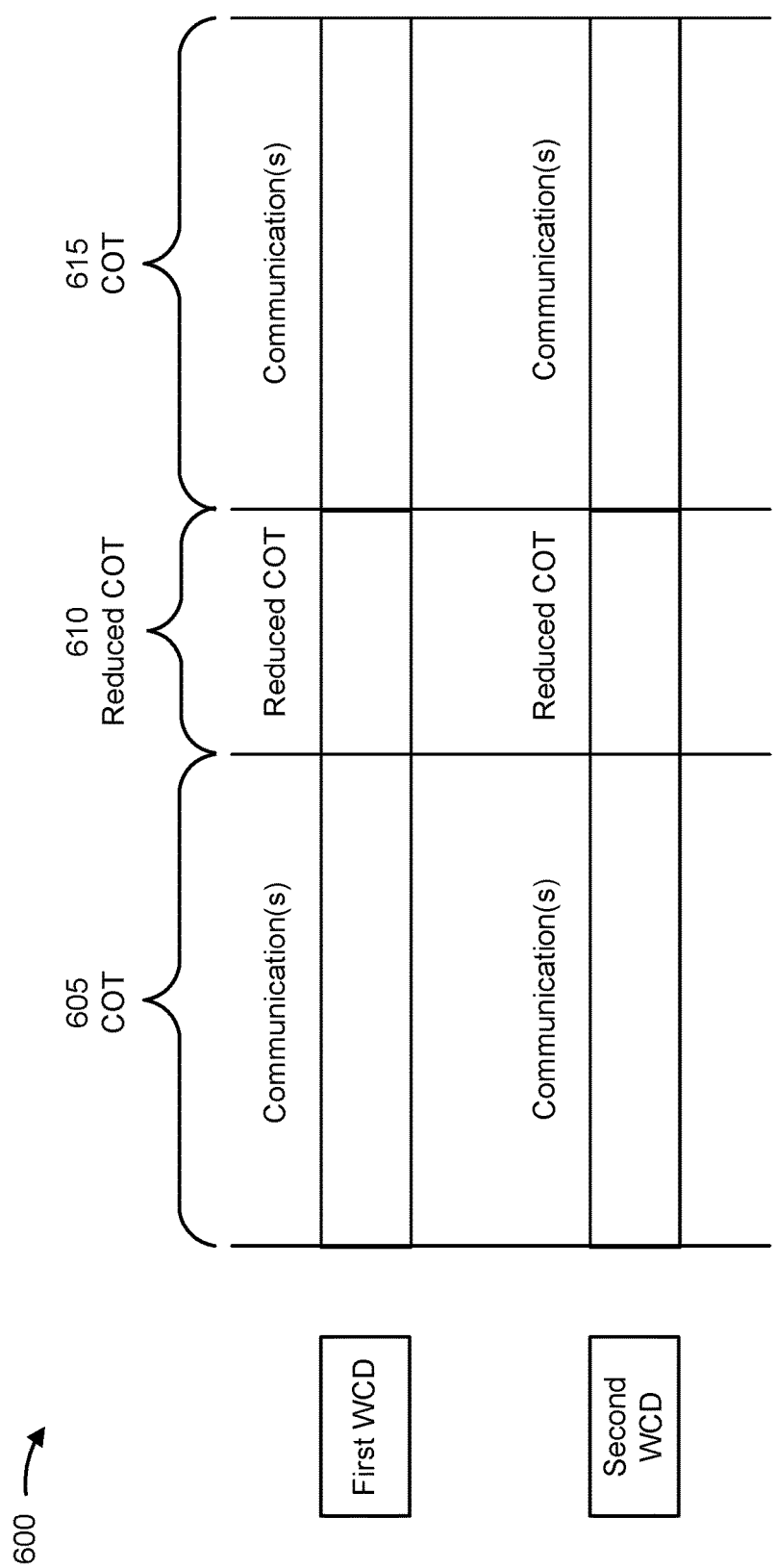

FIG. 4 is a diagram illustrating an example 600 of transmissions in an unlicensed band, in accordance with various aspects of the present disclosure. As shown in FIG. 6, a first WCD (e.g., base station 110 or UE 120, among other examples) may communicate with a second WCD (e.g., base station 110 or UE 120, among other examples). In some aspects, the first WCD and the second WCD may be part of a wireless network (e.g., wireless network 100). In some aspects, the first WCD and the second WCD may communicate via an unlicensed band that does not require channel sensing (e.g., no-LBT channel access) before beginning a transmission. In some aspects, the wireless network may include an unlicensed band in a sub 7 GHz band and/or one or more millimeter wave bands.

The first WCD and the second WCD may communicate during a COT 605. In some aspects, the first WCD may transmit one or more communications to the second WCD and/or the second WCD may transmit one or more communications to the first WCD during the COT 605. In some aspects, a duration of the COT 605 may be based at least in part on a communication standard or configuration information, among other examples. In some aspects, the duration may be determined based at least in part on an amount of time of communication without a gap.

The first WCD and the second WCD may initiate a reduced COT 610 after the COT 605. In some aspects, a duration of the reduced COT 610 (e.g., an away time) may be based at least in part on, and/or a function of, a duration of the COT 605. In some aspects, the duration of the reduced COT 610 may be at least as long as a minimum duration of a reduced COT 610, which may be based at least in part on, and/or a function of, the duration of the COT 605. In some aspects, a duration of the reduced COT 610 may be constant or a random number drawn from a distribution parameterized by a function of the COT 605. In some aspects, the WCD may not transmit and/or may not receive communications during the reduced COT.

The first WCD and the second WCD may initiate a COT 615 after the reduced COT 610. In some aspects, the first WCD or the second WCD may initiate the COT 615 based at least in part on receiving a communication from the other of the second WCD or the first WCD after the reduced COT 610.

As indicated above, FIG. 6 is provided as an example. Other examples may differ from what is described with regard to FIG. 6.

Figure 7:
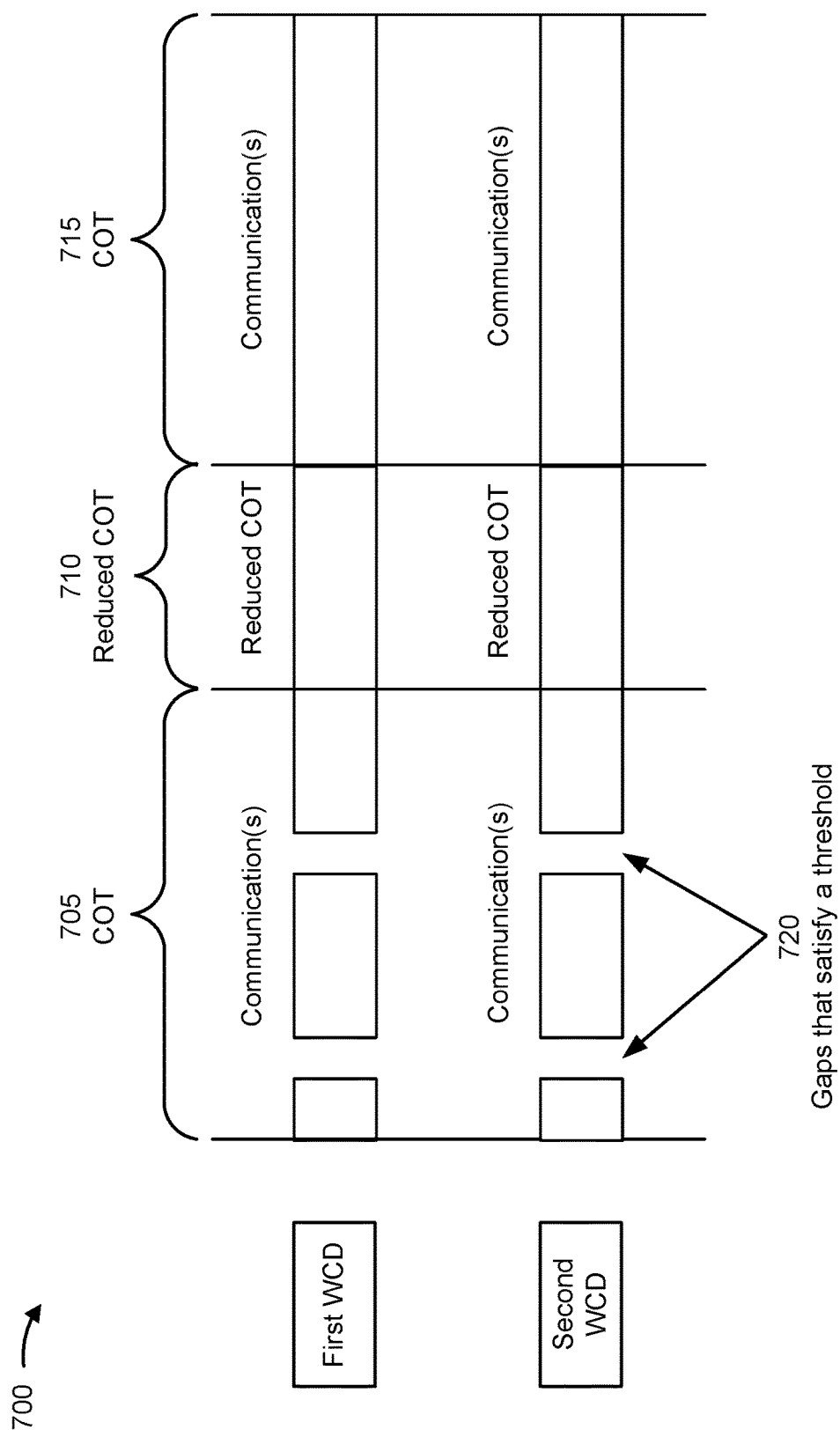

FIG. 7 is a diagram illustrating an example 700 of transmissions in an unlicensed band, in accordance with various aspects of the present disclosure. As shown in FIG. 7, a first WCD (e.g., base station 110 or UE 120, among other examples) may communicate with a second WCD (e.g., base station 110 or UE 120, among other examples). In some aspects, the first WCD and the second WCD may be part of a wireless network (e.g., wireless network 100). In some aspects, the first WCD and the second WCD may communicate via an unlicensed band that does not require channel sensing before beginning a transmission. In some aspects, the wireless network may include an unlicensed band in a sub 7 GHz band and/or one or more millimeter wave bands.

The first WCD and the second WCD may communicate during a COT 705. In some aspects, the first WCD may transmit one or more communications to the second WCD and/or the second WCD may transmit one or more communications to the first WCD during the COT 705. In some aspects, a duration may be determined based at least in part on an amount of time of communication (transmissions and/or receptions) without a gap. In some aspects, the duration may be determined based at least in part on an amount of time of communication without a gap that satisfies a gap duration threshold. For example, a duration of the COT 705 may be determined based at least in part on an interval that includes multiple transmissions and/or receptions with one or more gaps 720 that satisfy a threshold (e.g., a gap duration threshold). In some aspects, the COT may include uplink transmissions and downlink transmissions. In other words, the COT may include transmissions from the first WCD to the second WCD and transmissions from the second WCD to the first WCD.

As described with respect to FIG. 6, the first WCD and the second WCD may initiate a reduced COT 710 after the COT 705. In some aspects, a duration of the reduced COT 710 may be based at least in part on, and/or a function of, a duration of the COT 705. In some aspects, the duration of the reduced COT 710 may be at least as long as a minimum duration of a reduced COT 710, which may be based at least in part on, and/or a function of, the duration of the COT 705. In some aspects, a duration of the reduced COT 710 may be constant or a random number drawn from a distribution parameterized by a function of the COT 705. In some aspects, the WCD may not transmit and/or may not receive communications during the reduced COT.

The first WCD and the second WCD may initiate a COT 715 after the reduced COT 710. In some aspects, the first WCD or the second WCD may initiate the COT 715 based at least in part on receiving a communication from the other of the second WCD or the first WCD after the reduced COT 710.

As indicated above, FIG. 7 is provided as an example. Other examples may differ from what is described with regard to FIG. 7.

Figure 8:
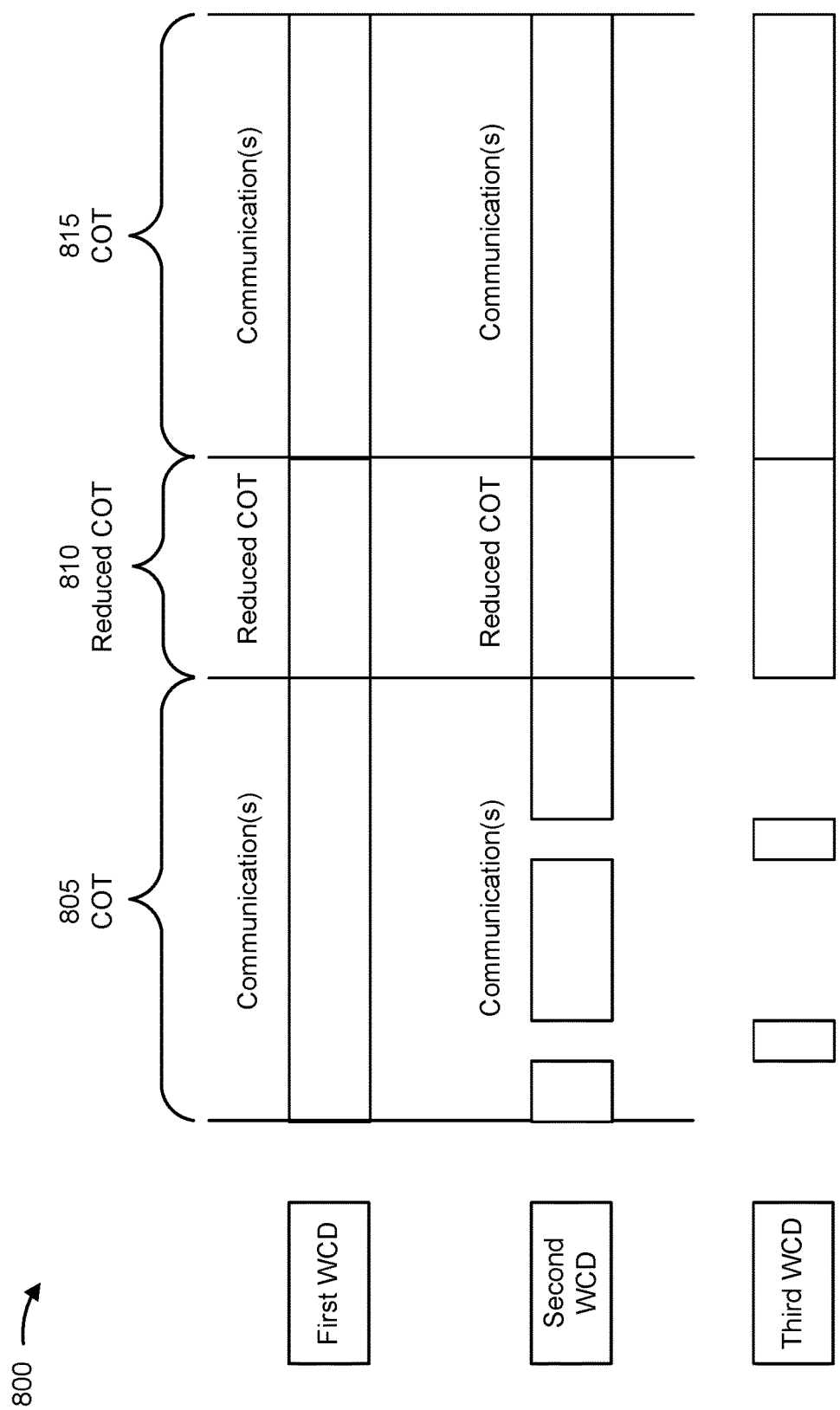

FIG. 8 is a diagram illustrating an example 800 of transmissions in an unlicensed band, in accordance with various aspects of the present disclosure. As shown in FIG. 8, a first WCD (e.g., base station 110 or UE 120, among other examples) may communicate with a second WCD (e.g., base station 110 or UE 120, among other examples) and a third WCD (e.g., base station 110 or UE 120, among other examples). In some aspects, the first WCD, the second WCD, and the third WCD may be part of a wireless network (e.g., wireless network 100). In some aspects, the first WCD, the second WCD, and the third WCD may communicate via an unlicensed band that does not require channel sensing before beginning a transmission. In some aspects, the wireless network may include an unlicensed band in a sub 7 GHz band and/or one or more millimeter wave bands.

The first WCD may communicate with the second WCD and the third WCD during a COT 805. In some aspects, the first WCD may transmit one or more communications to the second WCD and/or the third WCD during the COT 805. In some aspects, the first WCD may receive one or more communications from the second WCD and the third WCD during the COT 805. In some aspects, a duration may be determined based at least in part on an amount of time of communication by the first WCD (transmissions or receptions) without a gap. In some aspects, a duration may be determined based at least in part on an amount of time of communication by the first WCD without a gap that satisfies a gap duration threshold. For example, a duration of the COT 805 may be determined based at least in part on an interval that includes multiple transmissions with multiple WCDs.

As described with respect to FIG. 6, the first WCD, the second WCD, and the third WCD may initiate a reduced COT 810 after the COT 805. In some aspects, a duration of the reduced COT 810 (e.g., an away time) may be based at least in part on, and/or a function of, a duration of the COT 805. In some aspects, the duration of the reduced COT 810 may be at least as long as a minimum duration of a reduced COT 810, which may be based at least in part on, and/or a function of, the duration of the COT 805. In some aspects, a duration of the reduced COT 810 may be constant or a random number drawn from a distribution parameterized by a function of the COT 805. In some aspects, the WCD may not transmit and/or may not receive communications during the reduced COT.

The first WCD, the second WCD, and/or the third WCD may initiate a COT 815 after the reduced COT 810. In some aspects, the first WCD or the second WCD may initiate the COT 815 based at least in part on receiving a communication from the other of the second WCD or the first WCD after the reduced COT 810.

As indicated above, FIG. 8 is provided as an example. Other examples may differ from what is described with regard to FIG. 8.

Figure 9:
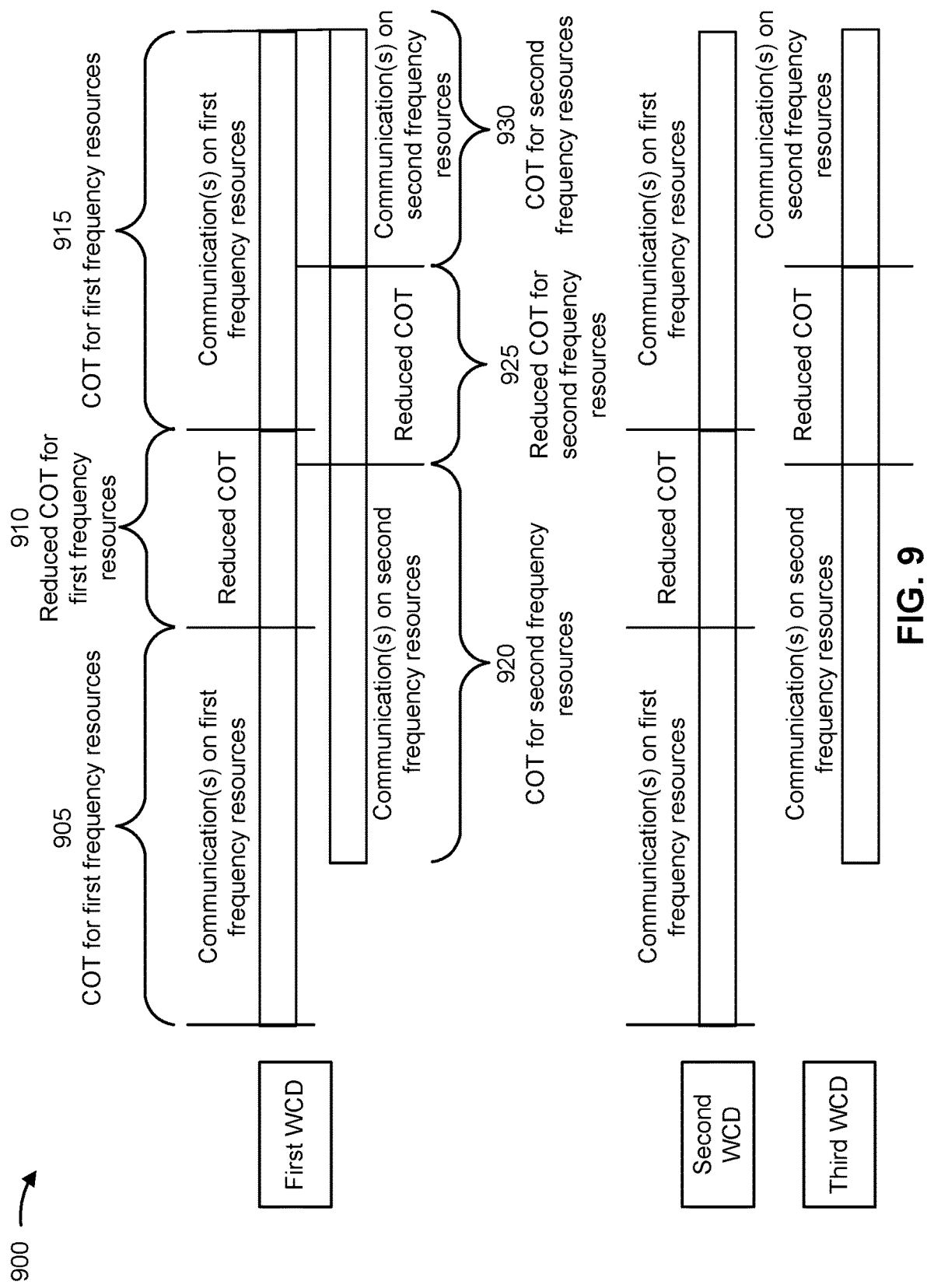

FIG. 9 is a diagram illustrating an example 900 of transmissions in an unlicensed band, in accordance with various aspects of the present disclosure. As shown in FIG. 9, a first WCD (e.g., base station 110 or UE 120, among other examples) may communicate with a second WCD (e.g., base station 110 or UE 120, among other examples) and a third WCD (e.g., base station 110 or UE 120, among other examples). In some aspects, the first WCD, the second WCD, and the third WCD may be part of a wireless network (e.g., wireless network 100). In some aspects, the first WCD, the second WCD, and the third WCD may communicate via an unlicensed band that does not require channel sensing before beginning a transmission. In some aspects, the wireless network may include an unlicensed band in a sub 7 GHz band and/or one or more millimeter wave bands.

The first WCD may communicate with the second WCD during a COT 905 for first frequency resources. In some aspects, the first WCD may transmit one or more communications to the second WCD during the COT 905. In some aspects, the first WCD may receive one or more communications from the second WCD during the COT 905. In some aspects, a duration may be determined based at least in part on an amount of time of communication by the first WCD, using the first frequency resources, without a gap. In some aspects, a duration may be determined based at least in part on an amount of time of communication by the first WCD, using the first frequency resources, without a gap that satisfies a gap duration threshold. For example, a duration of the COT 905 may be determined based at least in part on an interval that includes multiple transmissions to the second WCD or from the second WCD using the first frequency resources.

As described with respect to FIG. 6, the first WCD and/or the second WCD may initiate a reduced COT 910 after the COT 905. In some aspects, a duration of the reduced COT 910 (e.g., an away time) may be based at least in part on, and/or a function of, a duration of the COT 905. In some aspects, the duration of the reduced COT 910 may be at least as long as a minimum duration of a reduced COT 910, which may be based at least in part on, and/or a function of, the duration of the COT 905. In some aspects, a duration of the reduced COT 910 may be constant or a random number drawn from a distribution parameterized by a function of the COT 905. The reduced COT 910 may be applied to the first frequency resources and not to a second frequency resources. In some aspects, the WCD may not transmit and/or may not receive communications during the reduced COT.

The first WCD and/or the second WCD may initiate a COT 915 after the reduced COT 910. In some aspects, the first WCD or the second WCD may initiate the COT 915 based at least in part on receiving a communication from the other of the second WCD or the first WCD after the reduced COT 910. For example, the second WCD may initiate the COT 915 based at least in part on receiving a communication from the first WCD.

The first WCD may communicate with the third WCD during a COT 920 for second frequency resources. In some aspects, the first WCD may transmit one or more communications to the third WCD during the COT 920. In some aspects, the first WCD may receive one or more communications from the third WCD during the COT 920. In some aspects, a duration may be determined based at least in part on an amount of time of communication by the first WCD, using the second frequency resources, without a gap. In some aspects, a duration may be determined based at least in part on an amount of time of communication by the first WCD, using the second frequency resources, without a gap that satisfies a gap duration threshold. For example, a duration of the COT 920 may be determined based at least in part on an interval that includes multiple transmissions to the third WCD or from the third WCD using the second frequency resources.

As described with respect to FIG. 6, the first WCD and/or the third WCD may initiate a reduced COT 925 after the COT 920. In some aspects, a duration of the reduced COT 925 (e.g., an away time) may be based at least in part on, and/or a function of, a duration of the COT 920. In some aspects, the duration of the reduced COT 925 may be at least as long as a minimum duration of a reduced COT 925, which may be based at least in part on, and/or a function of, the duration of the COT 920. In some aspects, a duration of the reduced COT 925 may be constant or a random number drawn from a distribution parameterized by a function of the COT 920. The reduced COT 925 may be applied to the second frequency resources and not to the first frequency resources. In some aspects, the WCD may not transmit and/or may not receive communications during the reduced COT.

The first WCD and/or the third WCD may initiate a COT 930 after the reduced COT 925. In some aspects, the first WCD or the third WCD may initiate the COT 930 based at least in part on receiving a communication from the other of the third WCD or the first WCD after the reduced COT 925. For example, the third WCD may initiate the COT 30 based at least in part on receiving a communication from the first WCD. In some aspects, the first WCD may communicate via the first frequency resources while in a reduced COT for the second frequency resources and/or may communicate via the second frequency resources while in a reduced COT for the first frequency resources.

In some aspects, the first frequency resources and/or the second frequency resources may be associated with different physical resource blocks, different bandwidth parts, different component carriers, and/or different LBT bandwidths.

As indicated above, FIG. 9 is provided as an example. Other examples may differ from what is described with regard to FIG. 9.

Figure 10:
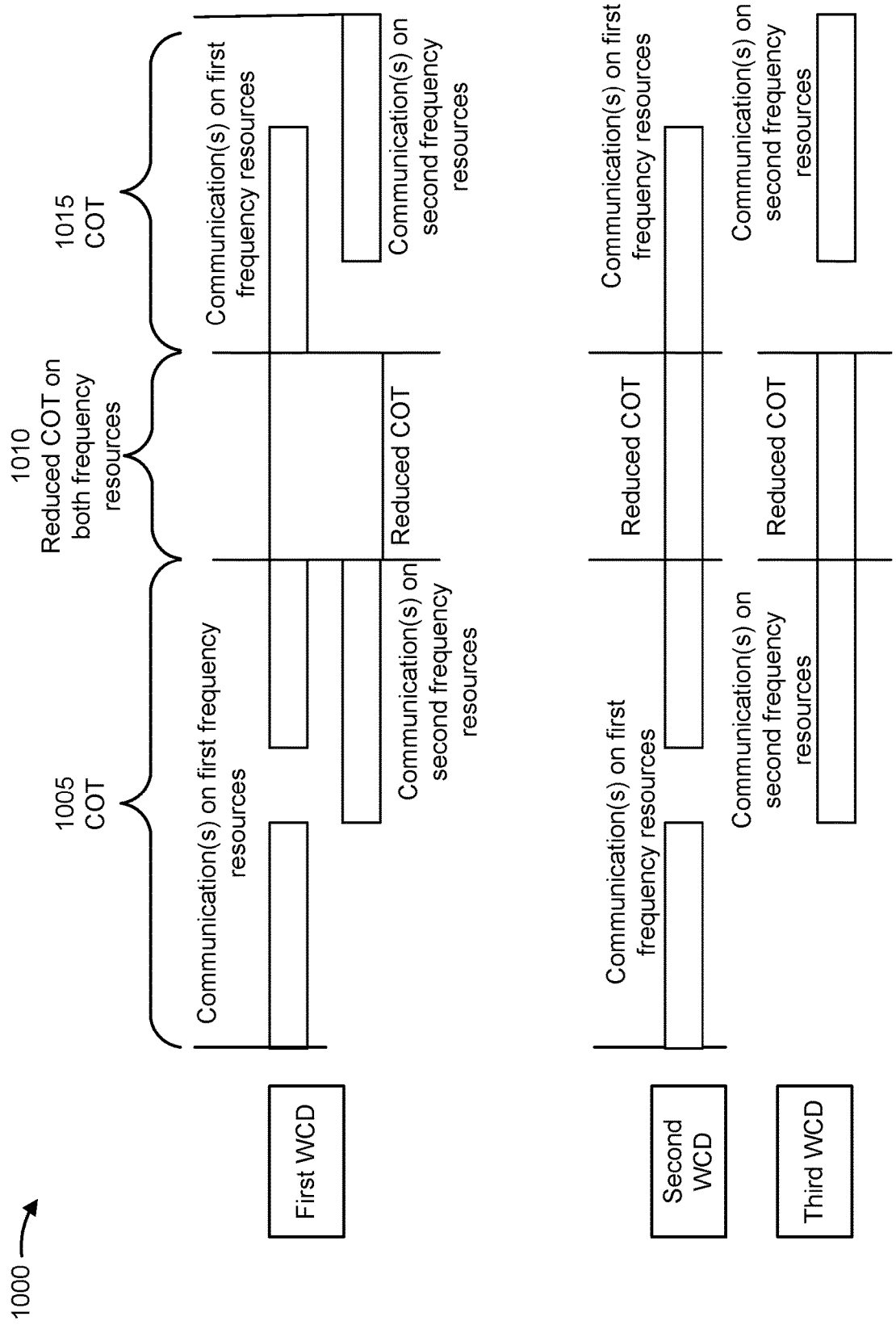

FIG. 10 is a diagram illustrating an example 1000 of transmissions in an unlicensed band, in accordance with various aspects of the present disclosure. As shown in FIG. 10, a first WCD (e.g., base station 110 or UE 120, among other examples) may communicate with a second WCD (e.g., base station 110 or UE 120, among other examples) and a third WCD (e.g., base station 110 or UE 120, among other examples). In some aspects, the first WCD, the second WCD, and the third WCD may be part of a wireless network (e.g., wireless network 100). In some aspects, the first WCD, the second WCD, and the third WCD may communicate via an unlicensed band that does not require channel sensing before beginning a transmission. In some aspects, the wireless network may include an unlicensed band in a sub 7 GHz band and/or one or more millimeter wave bands.

The first WCD may communicate with the second WCD and the third WCD during a COT 1005. The first WCD may communicate with the second WCD using a first frequency resources and may communicate with the third WCD using a second frequency resources. In some aspects, the first WCD may transmit one or more communications to the second WCD and/or the third WCD during the COT 1005. In some aspects, the first WCD may receive one or more communications from the second WCD and/or from the third WCD during the COT 1005.

In some aspects, a duration may be determined based at least in part on an amount of time of communication by the first WCD, using any of the first frequency resources or the second frequency resources, without a gap. In some aspects, a duration may be determined based at least in part on an amount of time of communication by the first WCD, using any of the first frequency resources or the second frequency resources, without a gap that satisfies a gap duration threshold. For example, a duration of the COT 1005 may be based at least in part on an interval that includes multiple transmissions to the second WCD or from the second WCD using the first frequency resources and transmissions to the third WCD or from the third WCD using the second frequency resources. In other words, a COT may be determined based at least in part on communications via the first frequency resources and the second frequency resources jointly.

As described with respect to FIG. 6, the first WCD, the second WCD, and/or the third WCD may initiate a reduced COT 1010 after the COT 1005. In some aspects, a duration of the reduced COT 1010 (e.g., an away time) may be based at least in part on, and/or a function of, a duration of the COT 1005. In some aspects, the duration of the reduced COT 1010 may be at least as long as a minimum duration of a reduced COT 1010, which may be based at least in part on, and/or a function of, the duration of the COT 1005. In some aspects, a duration of the reduced COT 1010 may be constant or a random number drawn from a distribution parameterized by a function of the COT 1005. The reduced COT 1010 may be applied to the first frequency resources and to the second frequency resources. In some aspects, the WCD may not transmit and/or may not receive communications during the reduced COT.

The first WCD and/or the second WCD may initiate a COT 1015 after the reduced COT 1010. In some aspects, the first WCD or the second WCD may initiate the COT 1015 based at least in part on receiving a communication from the other of the second WCD or the first WCD after the reduced COT 1010. For example, the second WCD and/or the third WCD may initiate the COT 1015 based at least in part on receiving a communication from the first WCD.

In some aspects, the first frequency resources and/or the second frequency resources may be associated with different physical resource blocks, different bandwidth parts, different component carriers, and/or different LBT bandwidths.

As indicated above, FIG. 10 is provided as an example. Other examples may differ from what is described with regard to FIG. 10.

Figure 11:
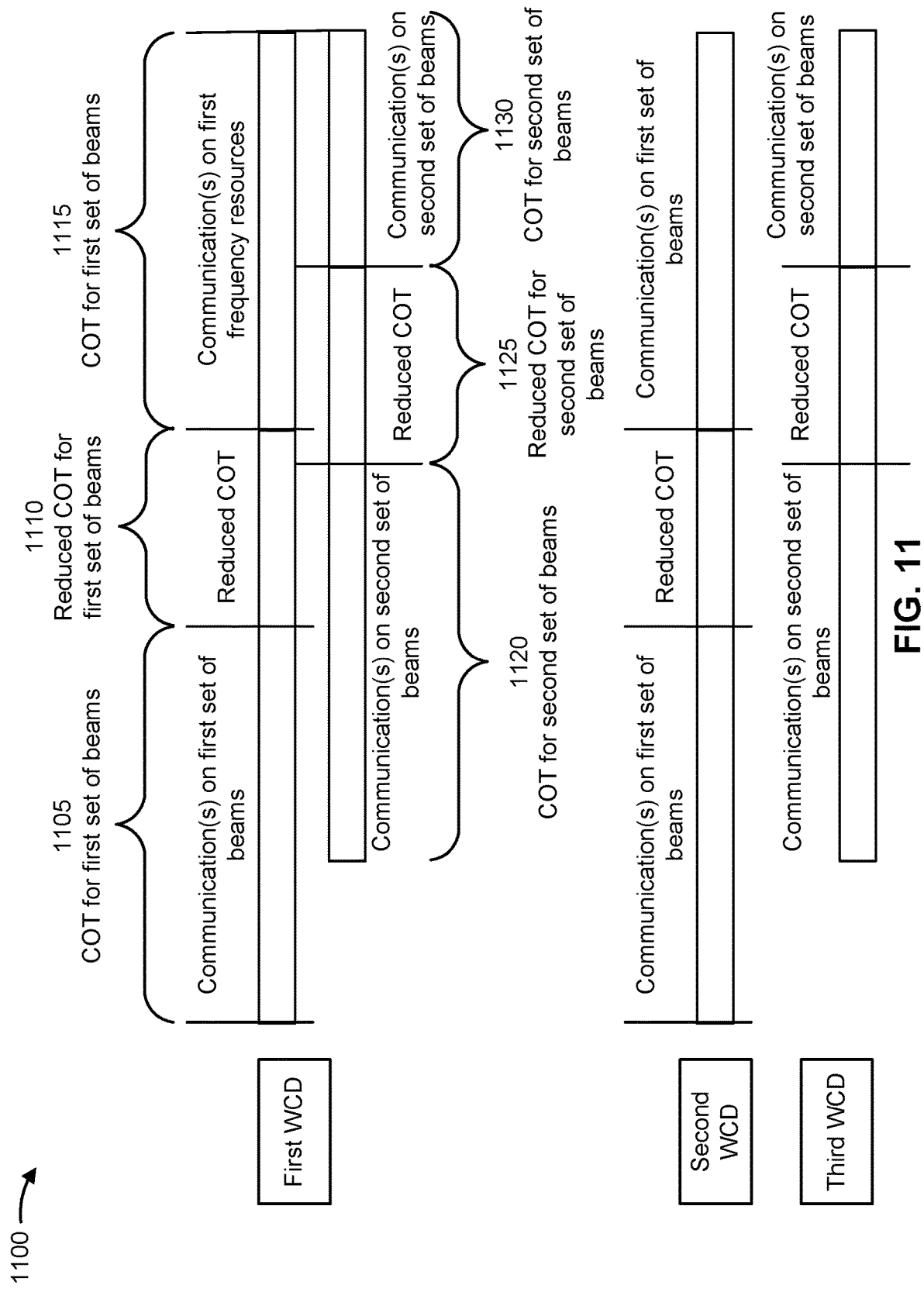

FIG. 11 is a diagram illustrating an example 1100 of transmissions in an unlicensed band, in accordance with various aspects of the present disclosure. As shown in FIG. 11, a first WCD (e.g., base station 110 or UE 120, among other examples) may communicate with a second WCD (e.g., base station 110 or UE 120, among other examples) and a third WCD (e.g., base station 110 or UE 120, among other examples). In some aspects, the first WCD, the second WCD, and the third WCD may be part of a wireless network (e.g., wireless network 100). In some aspects, the first WCD, the second WCD, and the third WCD may communicate via an unlicensed band that does not require channel sensing before beginning a transmission. In some aspects, the wireless network may include an unlicensed band in a sub 7 GHz band and/or one or more millimeter wave bands.

The first WCD may communicate with the second WCD during a COT 1105 for a first set of beams. In some aspects, the first WCD may transmit one or more communications to the second WCD during the COT 1105. In some aspects, the first WCD may receive one or more communications from the second WCD during the COT 1105. In some aspects, a duration may be determined based at least in part on an amount of time of communication by the first WCD, using the first set of beams, without a gap. In some aspects, a duration may be determined based at least in part on an amount of time of communication by the first WCD, using the first set of beams, without a gap that satisfies a gap duration threshold. For example, a duration of the COT 1105 may be determined based at least in part on an interval that includes multiple transmissions to the second WCD or from the second WCD using the first set of beams.

As described with respect to FIG. 6, the first WCD and/or the second WCD may initiate a reduced COT 1110 after the COT 1105. In some aspects, a duration of the reduced COT 1110 (e.g., an away time) may be based at least in part on, and/or a function of, a duration of the COT 1105. In some aspects, the duration of the reduced COT 1110 may be at least as long as a minimum duration of a reduced COT 1110, which may be based at least in part on, and/or a function of, the duration of the COT 1105. In some aspects, a duration of the reduced COT 1110 may be constant or a random number drawn from a distribution parameterized by a function of the COT 1105. The reduced COT 1110 may be applied to the first set of beams and not to a second set of beams. In some aspects, the WCD may not transmit and/or may not receive communications during the reduced COT.

The first WCD and/or the second WCD may initiate a COT 1115 after the reduced COT 1110. In some aspects, the first WCD or the second WCD may initiate the COT 1115 based at least in part on receiving a communication from the other of the second WCD or the first WCD after the reduced COT 1110. For example, the second WCD may initiate the COT 1115 based at least in part on receiving a communication from the first WCD.

The first WCD may communicate with the third WCD during a COT 1120 for second set of beams. In some aspects, the first WCD may transmit one or more communications to the third WCD during the COT 1120. In some aspects, the first WCD may receive one or more communications from the third WCD during the COT 1120. In some aspects, a duration may be determined based at least in part on an amount of time of communication by the first WCD, using the second set of beams, without a gap. In some aspects, a duration may be determined based at least in part on an amount of time of communication by the first WCD, using the second set of beams, without a gap that satisfies a gap duration threshold. For example, a duration of the COT 1120 may be determined based at least in part on an interval that includes multiple transmissions to the third WCD or from the third WCD using the second set of beams.

As described with respect to FIG. 6, the first WCD and/or the third WCD may initiate a reduced COT 1125 after the COT 1120. In some aspects, a duration of the reduced COT 1125 (e.g., an away time) may be based at least in part on, and/or a function of, a duration of the COT 1120. In some aspects, the duration of the reduced COT 1125 may be at least as long as a minimum duration of a reduced COT 1125, which may be based at least in part on, and/or a function of, the duration of the COT 1120. In some aspects, a duration of the reduced COT 1125 may be constant or a random number drawn from a distribution parameterized by a function of the COT 1120. The reduced COT 1125 may be applied to the second set of beams and not to the first set of beams. In some aspects, the WCD may not transmit and/or may not receive communications during the reduced COT.

The first WCD and/or the third WCD may initiate a COT 1130 after the reduced COT 1125. In some aspects, the first WCD or the third WCD may initiate the COT 1130 based at least in part on receiving a communication from the other of the third WCD or the first WCD after the reduced COT 1125. For example, the third WCD may initiate the COT 30 based at least in part on receiving a communication from the first WCD. In some aspects, the first WCD may communicate via the first set of beams while in a reduced COT for the second set of beams and/or may communicate via the second set of beams while in a reduced COT for the first set of beams. In this way, the network may support beam persistence (e.g., for time division multiplexed beams).

As indicated above, FIG. 11 is provided as an example. Other examples may differ from what is described with regard to FIG. 11.

Figure 12:
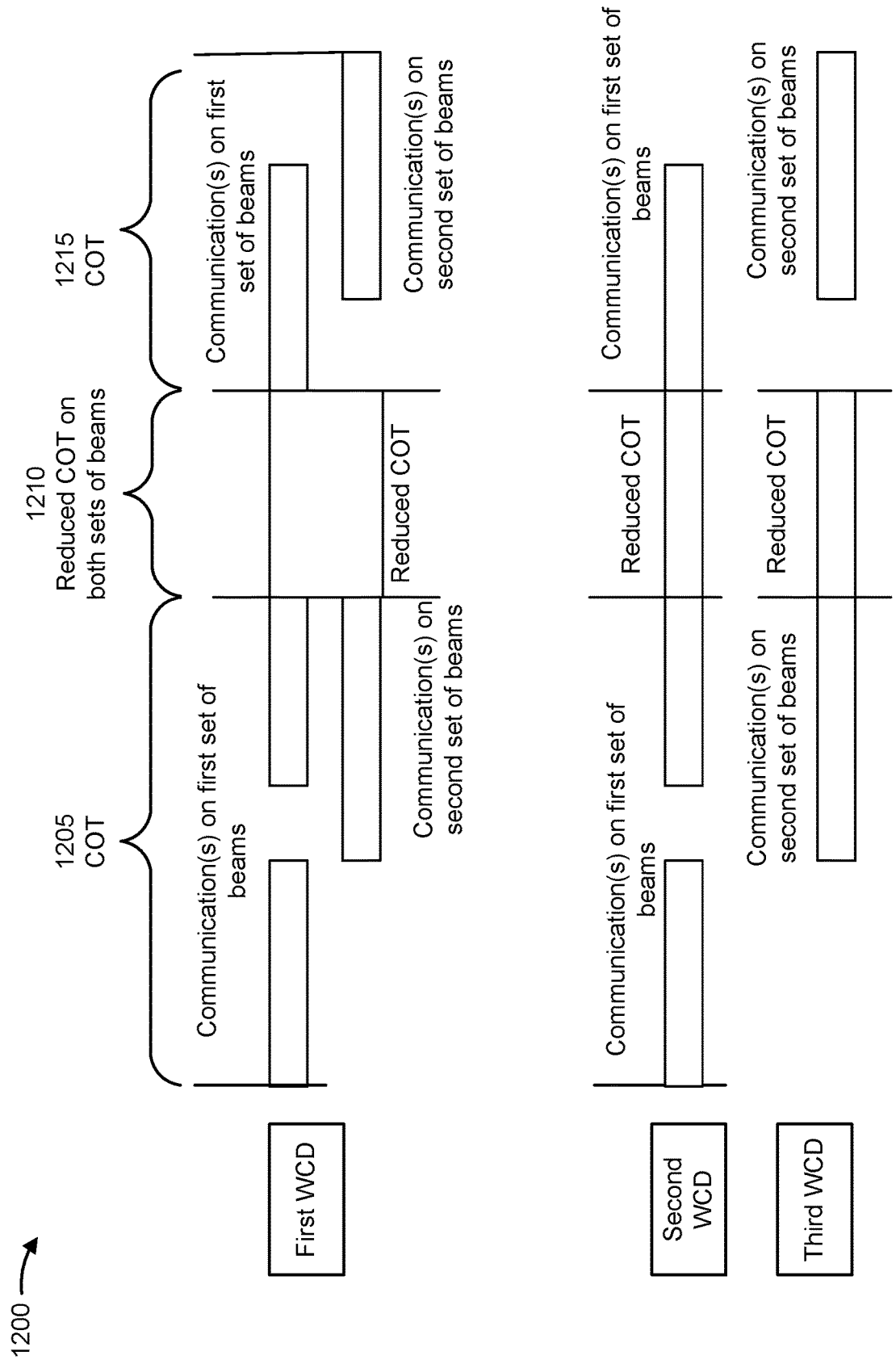

FIG. 12 is a diagram illustrating an example 1200 of transmissions in an unlicensed band, in accordance with various aspects of the present disclosure. As shown in FIG. 12, a first WCD (e.g., base station 110 or UE 120, among other examples) may communicate with a second WCD (e.g., base station 110 or UE 120, among other examples) and a third WCD (e.g., base station 110 or UE 120, among other examples). In some aspects, the first WCD, the second WCD, and the third WCD may be part of a wireless network (e.g., wireless network 100). In some aspects, the first WCD, the second WCD, and the third WCD may communicate via an unlicensed band that does not require channel sensing before beginning a transmission. In some aspects, the wireless network may include an unlicensed band in a sub 7 GHz band and/or one or more millimeter wave bands.

The first WCD may communicate with the second WCD and the third WCD during a COT 1205. The first WCD may communicate with the second WCD using a first set of beams and may communicate with the third WCD using a second set of beams. In some aspects, the first WCD may transmit one or more communications to the second WCD and/or the third WCD during the COT 1205. In some aspects, the first WCD may receive one or more communications from the second WCD and/or from the third WCD during the COT 1205.

In some aspects, a duration may be determined based at least in part on an amount of time of communication by the first WCD, using any of the first set of beams or the second set of beams, without a gap. In some aspects, a duration may be determined based at least in part on an amount of time of communication by the first WCD, using any of the first set of beams or the second set of beams, without a gap that satisfies a gap duration threshold. For example, a duration of the COT 1205 may be determined based at least in part on an interval that includes multiple transmissions to the second WCD or from the second WCD using the first set of beams and transmissions to the third WCD or from the third WCD using the second set of beams. In other words, a COT may be determine based at least in part on communications via the first set of beams and the second set of beams jointly.

As described with respect to FIG. 6, the first WCD, the second WCD, and/or the third WCD may initiate a reduced COT 1210 after the COT 1205. In some aspects, a duration of the reduced COT 1210 (e.g., an away time) may be based at least in part on, and/or a function of, a duration of the COT 1205. In some aspects, the duration of the reduced COT 1210 may be at least as long as a minimum duration of a reduced COT 1210, which may be based at least in part on, and/or a function of, the duration of the COT 1205. In some aspects, a duration of the reduced COT 1210 may be constant or a random number drawn from a distribution parameterized by a function of the COT 1205. The reduced COT 1210 may be applied to the first set of beams and to the second set of beams. In some aspects, the WCD may not transmit and/or may not receive communications during the reduced COT.

The first WCD and/or the second WCD may initiate a COT 1015 after the reduced COT 1210. In some aspects, the first WCD or the second WCD may initiate the COT 1015 based at least in part on receiving a communication from the other of the second WCD or the first WCD after the reduced COT 1210. For example, the second WCD and/or the third WCD may initiate the COT 1015 based at least in part on receiving a communication from the first WCD.

As indicated above, FIG. 12 is provided as an example. Other examples may differ from what is described with regard to FIG. 12.

Figure 13:
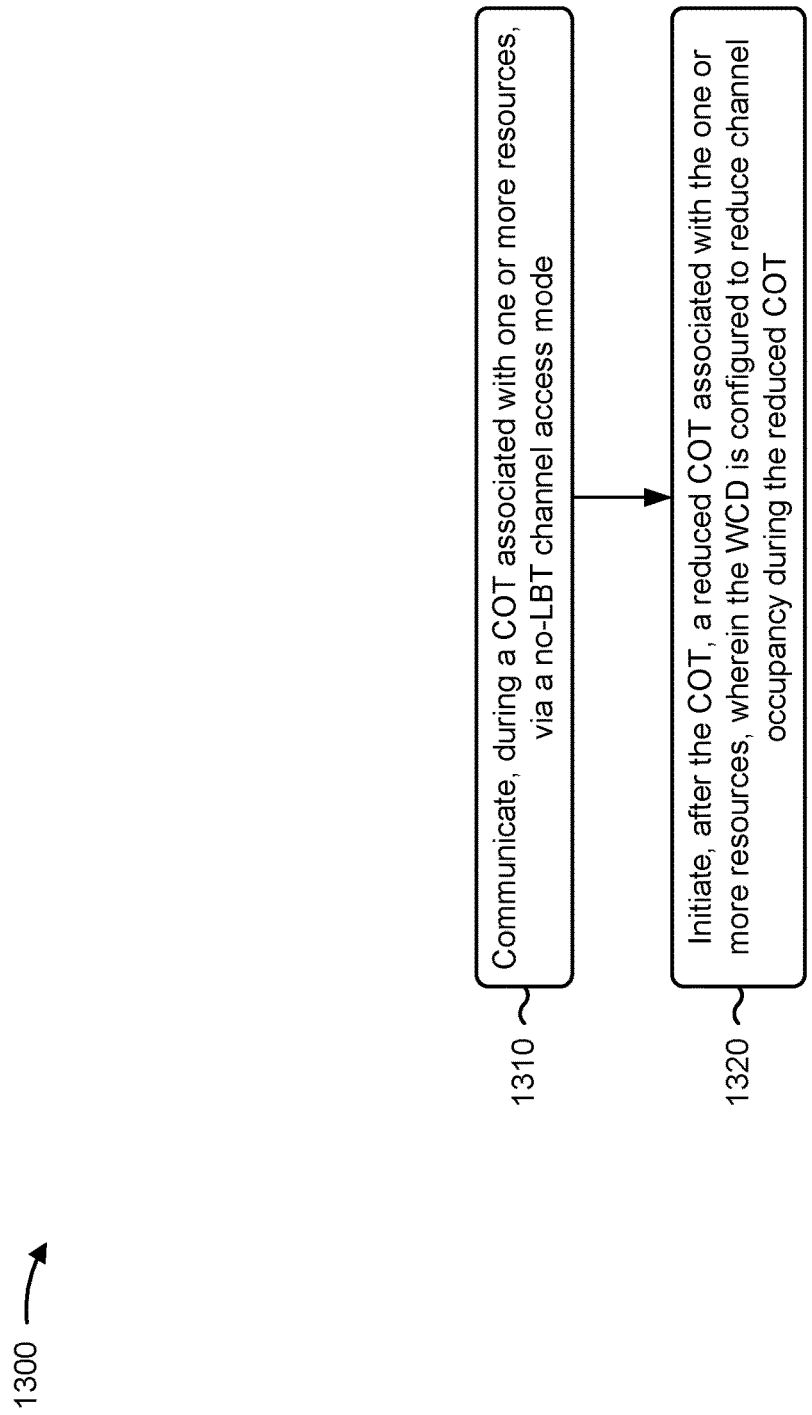
FIG. 13 is a diagram illustrating an example process associated with channel occupancy time in a no-listen before talk channel access mode, in accordance with various aspects of the present disclosure.

FIG. 13 is a diagram illustrating an example process 1300 performed, for example, by a WCD, in accordance with various aspects of the present disclosure. Example process 1300 is an example where the WCD (e.g., base station 110 or UE 120, among other examples) performs operations associated with channel occupancy time in a no-listen before talk channel access mode.

As shown in FIG. 13, in some aspects, process 1300 may include communicating, during a COT associated with one or more resources, via a LBT channel access mode (block 1310). For example, the WCD (e.g., using reception component 1402 and/or transmission component 1404) may communicate, during a COT associated with one or more resources, via a LBT channel access mode, as described above.

As further shown in FIG. 13, in some aspects, process 1300 may include initiating, after the COT, a reduced COT associated with the one or more resources, wherein the WCD is configured to reduce channel occupancy during the reduced COT (block 1320). For example, the WCD (e.g., using communication manager 1408) may initiate, after the COT, a reduced COT associated with the one or more resources, wherein the WCD is configured to reduce channel occupancy during the reduced COT, as described above.

Process 1300 may include additional aspects, such as any single aspect or any combination of aspects described below and/or in connection with one or more other processes described elsewhere herein.

In a first aspect, process 1300 includes not initiating channel occupancy, not transmitting data via a data channel, not transmitting control information via a control channel, not attempting to receive signals from an additional WCD, not attempting to receive data via a data channel, or not attempting to receive control information via a control channel.

In a second aspect, alone or in combination with the first aspect, process 1300 includes reducing transmit power for transmissions, reducing an effective isotropic radiated power for transmissions, changing a traffic direction, reducing a beamforming gain, changing a beam direction, or changing a direction of beamforming with a threshold angular separation.

In a third aspect, alone or in combination with one or more of the first and second aspects, process 1300 includes determining to initiate the reduced COT based at least in part on one or more of detecting a gap in reception or transmission of communications, or detecting a gap, with a duration that satisfies a gap duration threshold, in reception or transmission of communications.

In a fourth aspect, alone or in combination with one or more of the first through third aspects, a duration of the reduced COT is based at least in part on one or more of a duration of the COT, a configured amount of time, a configured number of slots or subslots, or a randomly generated amount of time drawn from a distribution that is based at least in part on the duration of the COT.

In a fifth aspect, alone or in combination with one or more of the first through fourth aspects, the COT is configured with a duration that satisfies a threshold duration for communicating via the one or more resources.

In a sixth aspect, alone or in combination with one or more of the first through fifth aspects, a duration of the COT is based at least in part on an amount of time of transmission or reception without a gap, an amount of time of transmission or reception without a gap that satisfies a gap duration threshold, an amount of time of transmission and reception without a gap, or an amount of time of transmission and reception without a gap that satisfies the gap duration threshold.

In a seventh aspect, alone or in combination with one or more of the first through sixth aspects, a duration of the COT is based at least in part on an amount of time of communication with multiple additional WCDs without a gap, or an amount of time of communication with multiple additional WCDs without a gap that satisfies a gap duration threshold.

In an eighth aspect, alone or in combination with one or more of the first through seventh aspects, process 1300 includes initiating the reduced COT for a set of resources within one or more frequency resources.

In a ninth aspect, alone or in combination with one or more of the first through eighth aspects, initiating the reduced COT for the set of resources within the frequency resources comprises initiating the reduced COT for one or more of one or more physical resource blocks, one or more component carriers, one or more bandwidth parts, or one or more LBT bandwidths.

In a tenth aspect, alone or in combination with one or more of the first through ninth aspects, a duration of the COT is based at least in part on an amount of time of communication via a set of beams without a gap, an amount of time of communication via a set of beams without a gap that satisfies a gap duration threshold, an amount of time of communication via all beams, associated with the WCD, without a gap, or an amount of time of communication via all beams, associated with the WCD, without a gap that satisfies a gap duration threshold.

In an eleventh aspect, alone or in combination with one or more of the first through tenth aspects, initiating the reduced COT associated with the one or more resources comprises initiating the reduced COT for communication associated with a set of beams, or initiating the reduced COT for communication associated with all beams associated with the WCD.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
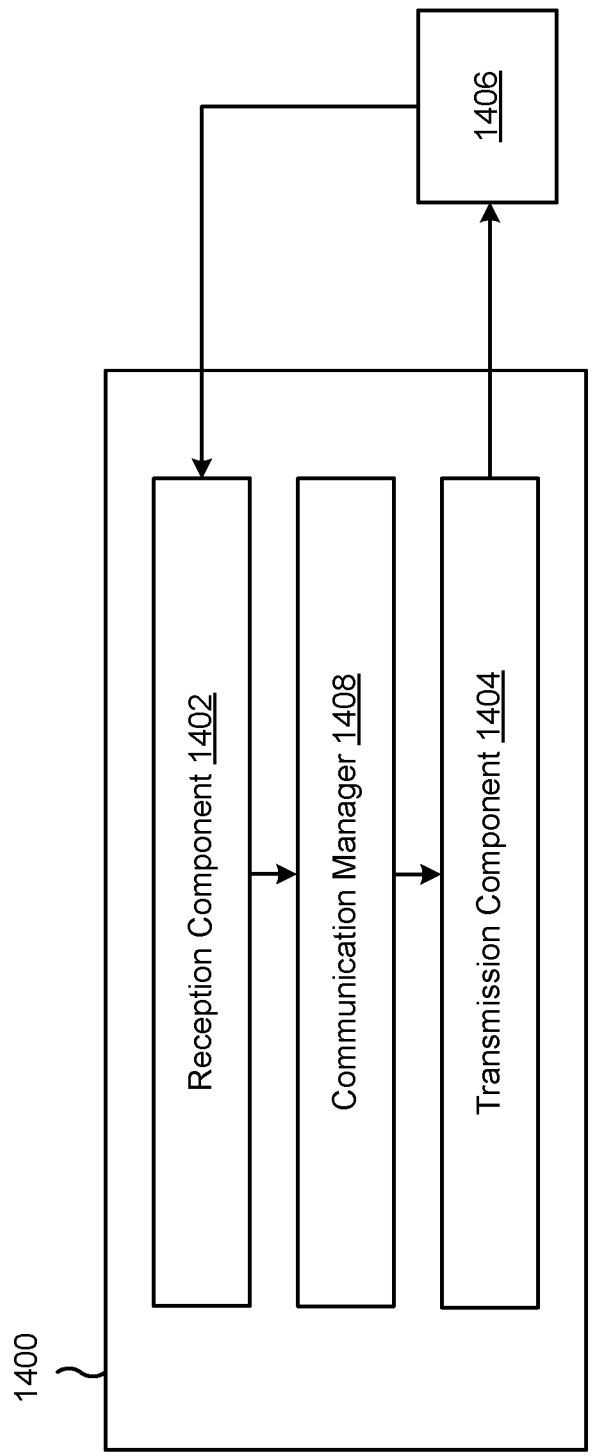
FIG. 14 is a block diagram of an example apparatus for wireless communication, in accordance with various aspects of the present disclosure.

FIG. 14 is a block diagram of an example apparatus 1400 for wireless communication. The apparatus 1400 may be a WCD, or a WCD may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a communication manager 1408.

In some aspects, the apparatus 1400 may be configured to perform one or more operations described herein in connection with FIGS. 5-12. Additionally, or alternatively, the apparatus 1400 may be configured to perform one or more processes described herein, such as process 1300 of FIG. 13. In some aspects, the apparatus 1400 and/or one or more components shown in FIG. 14 may include one or more components of the WCD described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the WCD described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the WCD described above in connection with FIG. 2. In some aspects, the transmission component 1404 may be co-located with the reception component 1402 in a transceiver.

The reception component 1402 and/or transmission component 1404 may communicate, during a COT associated with one or more resources, via a LBT channel access mode. The communication manager 1408 may initiate, after the COT, a reduced COT associated with the one or more resources, wherein the WCD is configured to reduce channel occupancy during the reduced COT.

The communication manager 1408 may reduce transmit power for transmissions, may reduce an effective isotropic radiated power for transmissions, may change a traffic direction, may reduce a beamforming gain, may change a beam direction, and/or may change a direction of beamforming with a threshold angular separation.

The communication manager 1408 may determine to initiate the reduced COT based at least in part on one or more of detecting a gap in reception or transmission of communications, or detecting a gap, with a duration that satisfies a gap duration threshold, in reception or transmission of communications.

The communication manager 1408 may initiate the reduced COT for a set of resources within one or more frequency resources and/or for one or more beams.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some aspects of the present disclosure:

Aspect 1: A method of wireless communication performed by a wireless communication device (WCD), comprising: communicating, during a channel occupancy time (COT) associated with one or more resources, via a no listen before talk (no-LBT) channel access mode; and initiating, after the COT, a reduced COT associated with the one or more resources, wherein the WCD is configured to reduce channel occupancy during the reduced COT.

Aspect 2: The method of aspect 1, wherein, during the reduced COT, the WCD is configured to reduce communications by one or more of: not initiating channel occupancy, not transmitting data via a data channel, not transmitting control information via a control channel, not attempting to receive signals from an additional WCD, not attempting to receive data via a data channel, or not attempting to receive control information via a control channel.

Aspect 3: The method of any of aspects 1 or 2, wherein, during the reduced COT, the WCD is configured to modify one or more communication parameters by one or more of: reducing transmit power for transmissions, reducing an effective isotropic radiated power for transmissions, changing a traffic direction, reducing a beamforming gain, changing a beam direction, or changing a direction of beamforming with a threshold angular separation.

Aspect 4: The method of any of aspects 1 through 3, further comprising: determining to initiate the reduced COT based at least in part on one or more of: detecting a gap in reception or transmission of communications, or detecting a gap, with a duration that satisfies a gap duration threshold, in reception or transmission of communications.

Aspect 5: The method of any of aspects 1 through 4, wherein a duration of the reduced COT is based at least in part on one or more of: a duration of the COT, a configured amount of time, a configured number of slots or subslots, or a randomly generated amount of time drawn from a distribution that is based at least in part on the duration of the COT.

Aspect 6: The method of any of aspects 1 through 5, wherein the COT is configured with a duration that satisfies a threshold duration for communicating via the one or more resources.

Aspect 7: The method of any of aspects 1 through 6, wherein a duration of the COT is based at least in part on: an amount of time of transmission or reception without a gap, an amount of time of transmission or reception without a gap that satisfies a gap duration threshold, an amount of time of transmission and reception without a gap, or an amount of time of transmission and reception without a gap that satisfies the gap duration threshold.

Aspect 8: The method of any of aspects 1 through 7, wherein a duration of the COT is based at least in part on: an amount of time of communication with multiple additional WCDs without a gap, or an amount of time of communication with multiple additional WCDs without a gap that satisfies a gap duration threshold.

Aspect 9: The method of any of aspects 1 through 8, wherein initiating the reduced COT associated with the one or more resources comprises: initiating the reduced COT for a set of resources within one or more frequency resources.

Aspect 10: The method of aspect 9, wherein initiating the reduced COT for the set of resources within the frequency resources comprises initiating the reduced COT for one or more of: one or more physical resource blocks, one or more component carriers, one or more bandwidth parts, or one or more LBT bandwidths.

Aspect 11: The method of any of aspects 1 through 10, wherein a duration of the COT is based at least in part on: an amount of time of communication via a set of beams without a gap, an amount of time of communication via a set of beams without a gap that satisfies a gap duration threshold, an amount of time of communication via all beams, associated with the WCD, without a gap, or an amount of time of communication via all beams, associated with the WCD, without a gap that satisfies a gap duration threshold.

Aspect 12: The method of any of aspects 1 through 11, wherein initiating the reduced COT associated with the one or more resources comprises: initiating the reduced COT for communication associated with a set of beams, or initiating the reduced COT for communication associated with all beams associated with the WCD.

Aspect 13: An apparatus for wireless communication at a device, comprising a processor; memory coupled with the processor; and instructions stored in the memory and executable by the processor to cause the apparatus to perform the method of one or more aspects of aspects 1-12.

Aspect 14: A device for wireless communication, comprising a memory and one or more processors coupled to the memory, the memory and the one or more processors configured to perform the method of one or more aspects of aspects 1-12.

Aspect 15: An apparatus for wireless communication, comprising at least one means for performing the method of one or more aspects of aspects 1-12.

Aspect 16: A non-transitory computer-readable medium storing code for wireless communication, the code comprising instructions executable by a processor to perform the method of one or more aspects of aspects 1-12.

Aspect 17: A non-transitory computer-readable medium storing a set of instructions for wireless communication, the set of instructions comprising one or more instructions that, when executed by one or more processors of a device, cause the device to perform the method of one or more aspects of aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device (WCD), comprising:
   configuring the WCD based at least in part on configuration information associated with a reduced channel occupancy time (COT);
   communicating, during a COT associated with one or more resources and based at least in part on configuring the WCD, via a no listen before talk (no-LBT) channel access mode; and
   initiating, after the COT and based at least in part on detecting a gap in reception or transmission of communications, the reduced COT associated with the gap and the one or more resources, wherein the WCD is configured to reduce channel occupancy during the reduced COT.

2. The method of claim 1, wherein, during the reduced COT, the WCD is configured to reduce communications by one or more of:
   not initiating channel occupancy,
   not transmitting data via a data channel,
   not transmitting control information via a control channel,
   not attempting to receive signals from an additional WCD,
   not attempting to receive data via a data channel, or not attempting to receive control information via a control channel.

3. The method of claim 1, wherein, during the reduced COT, the WCD is configured to modify one or more communication parameters by one or more of:
reducing transmit power for transmissions,
reducing an effective isotropic radiated power for transmissions,
changing a traffic direction,
reducing a beamforming gain,
changing a beam direction, or
changing a direction of beamforming with a threshold angular separation.

4. The method of claim 1, further comprising:
determining to initiate the reduced COT based at least in part on detecting the gap in reception or transmission of communications.

5. The method of claim 1, wherein a duration of the reduced COT is based at least in part on one or more of:
a duration of the COT,
a configured amount of time,
a configured number of slots or subslots, or
a randomly generated amount of time drawn from a distribution that is based at least in part on the duration of the COT.

6. The method of claim 1, wherein the COT is configured with a duration that satisfies a threshold duration for communicating via the one or more resources.

7. The method of claim 1, wherein a duration of the COT is based at least in part on:
an amount of time of transmission or reception without the gap,
an amount of time of transmission or reception without the gap that satisfies a gap duration threshold,
an amount of time of transmission and reception without the gap, or
an amount of time of transmission and reception without the gap that satisfies the gap duration threshold.

8. The method of claim 1, wherein a duration of the COT is based at least in part on:
an amount of time of communication with multiple additional WCDs without the gap, or
an amount of time of communication with multiple additional WCDs without the gap that satisfies a gap duration threshold.

9. The method of claim 1, wherein initiating the reduced COT associated with the one or more resources comprises:
initiating the reduced COT for a set of resources within one or more frequency resources.

10. The method of claim 9, wherein initiating the reduced COT for the set of resources within the one or more frequency resources comprises initiating the reduced COT for one or more of:
one or more physical resource blocks,
one or more component carriers,
one or more bandwidth parts, or
one or more LBT bandwidths.

11. The method of claim 1, wherein a duration of the COT is based at least in part on:
an amount of time of communication via a set of beams without the gap,
an amount of time of communication via a set of beams without the gap that satisfies a gap duration threshold,
an amount of time of communication via all beams, associated with the WCD, without the gap, or
an amount of time of communication via all beams, associated with the WCD, without the gap that satisfies a gap duration threshold.

12. The method of claim 1, wherein initiating the reduced COT associated with the one or more resources comprises:
initiating the reduced COT for communication associated with a set of beams, or
initiating the reduced COT for communication associated with all beams associated with the WCD.

13. A wireless communication device (WCD), comprising:
a memory; and
one or more processors coupled to the memory, the one or more processors configured to:
configure the WCD based at least in part on configuration information associated with a reduced channel occupancy time (COT);
communicate, during a COT associated with one or more resources and based at least in part on configuring the WCD, via a no listen before talk (no-LBT) channel access mode; and
initiate, after the COT and based at least in part on detecting a gap in reception or transmission of communications, the reduced COT associated with the gap and the one or more resources, wherein the WCD is configured to reduce channel occupancy during the reduced COT.

14. The WCD of claim 13, wherein, during the reduced COT, the WCD is configured to reduce communications by one or more of:
not initiating channel occupancy,
not transmitting data via a data channel,
not transmitting control information via a control channel,
not attempting to receive signals from an additional WCD,
not attempting to receive data via a data channel, or
not attempting to receive control information via a control channel.

15. The WCD of claim 13, wherein, during the reduced COT, the WCD is configured to modify one or more communication parameters by one or more of:
reduce transmit power for transmissions,
reduce an effective isotropic radiated power for transmissions,
change a traffic direction,
reduce a beamforming gain,
change a beam direction, or
change a direction of beamforming with a threshold angular separation.

16. The WCD of claim 13, wherein the one or more processors are further configured to:
determine to initiate the reduced COT based at least in part on detecting the gap in reception or transmission of communications.

17. The WCD of claim 13, wherein a duration of the reduced COT is based at least in part on one or more of:
a duration of the COT,
a configured amount of time,
a configured number of slots or subslots, or
a randomly generated amount of time drawn from a distribution that is based at least in part on the duration of the COT.

18. The WCD of claim 13, wherein the COT is configured with a duration that satisfies a threshold duration for communicating via the one or more resources.

19. The WCD of claim 13, wherein a duration of the COT is based at least in part on:

an amount of time of transmission or reception without the gap, an amount of time of transmission or reception without the gap that satisfies a gap duration threshold, an amount of time of transmission and reception without the gap, or an amount of time of transmission and reception without the gap that satisfies the gap duration threshold.

20. The WCD of claim 13, wherein a duration of the COT is based at least in part on:

an amount of time of communication with multiple additional WCDs without the gap, or an amount of time of communication with multiple additional WCDs without the gap that satisfies a gap duration threshold.

21. The WCD of claim 13, wherein the one or more processors, to initiate the reduced COT associated with the one or more resources, are configure to:

initiate the reduced COT for a set of resources within one or more frequency resources.

22. The WCD of claim 21, wherein the one or more processors, to initiate the reduced COT for the set of resources within the one or more frequency resources, are configured to initiate the reduced COT for one or more of:

one or more physical resource blocks, one or more component carriers, one or more bandwidth parts, or one or more LBT bandwidths.

23. The WCD of claim 13, wherein a duration of the COT is based at least in part on:

an amount of time of communication via a set of beams without the gap, an amount of time of communication via a set of beams without the gap that satisfies a gap duration threshold, an amount of time of communication via all beams, associated with the WCD, without the gap, or an amount of time of communication via all beams, associated with the WCD, without the gap that satisfies a gap duration threshold.

24. The WCD of claim 13, wherein the one or more processors, to initiate the reduced COT associated with the one or more resources, are configured to:

initiate the reduced COT for communication associated with a set of beams, or initiate the reduced COT for communication associated with all beams associated with the WCD.

25. A non-transitory computer-readable medium storing a set of instructions for wireless communication, the set of instructions comprising:

one or more instructions that, when executed by one or more processors of a wireless communication device (WCD), cause the WCD to:

configure the WCD based at least in part on configuration information associated with a reduced channel occupancy time (COT);

communicate, during a COT associated with one or more resources and based at least in part on figuring the WCD, via a no listen before talk (no-LBT) channel access mode; and initiate, after the COT and based at least in part on detect a gap in reception or transmission of communications, the reduced COT associated with the gap and the one or more resources, wherein the WCD is configured to reduce channel occupancy during the reduced COT.

26. The non-transitory computer-readable medium of claim 25, wherein, during the reduced COT, the WCD is configured to reduce communications by one or more of:

not initiating channel occupancy, not transmitting data via a data channel, not transmitting control information via a control channel, not attempting to receive signals from an additional WCD, not attempting to receive data via a data channel, or not attempting to receive control information via a control channel.

27. The non-transitory computer-readable medium of claim 25, wherein, during the reduced COT, the WCD is configured to modify one or more communication parameters by one or more of:

reduce transmit power for transmissions, reduce an effective isotropic radiated power for transmissions, change a traffic direction, reduce a beamforming gain, change a beam direction, or change a direction of beamforming with a threshold angular separation.

28. An apparatus for wireless communication, comprising:

means for configuring the apparatus based at least in part on configuration information associated with a reduced channel occupancy time (COT);

means for communicating, during a COT associated with one or more resources and based at least in part on configuring the apparatus, via a no listen before talk (no-LBT) channel access mode; and means for initiating, after the COT and based at least in part on detecting a gap in reception or transmission of communications, a reduced COT associated with the gap and the one or more resources, wherein the apparatus is configured to reduce channel occupancy during the reduced COT.

29. The apparatus of claim 28, wherein, during the reduced COT, the apparatus is configured to reduce communications by one or more of:

not initiating channel occupancy, not transmitting data via a data channel, not transmitting control information via a control channel, not attempting to receive signals from an additional apparatus, not attempting to receive data via a data channel, or not attempting to receive control information via a control channel.

30. The apparatus of claim 28, wherein, during the reduced COT, the apparatus is configured to modify one or more communication parameters by one or more of:

means for reducing transmit power for transmissions, means for reducing an effective isotropic radiated power for transmissions, means for changing a traffic direction, means for reducing a beamforming gain, means for changing a beam direction, or means for changing a direction of beamforming with a threshold angular separation.

* * * * *